(12) United States Patent
Kasahara et al.

(10) Patent No.: US 12,140,749 B2
(45) Date of Patent: Nov. 12, 2024

(54) VARIABLE WAVELENGTH FILTER, VARIABLE WAVELENGTH FILTER CONTROL METHOD, AND NON-TRANSITORY COMPUTER-READABLE STORAGE MEDIUM STORING COMPUTER PROGRAM

(71) Applicant: SEIKO EPSON CORPORATION, Tokyo (JP)

(72) Inventors: Hideaki Kasahara, Matsumoto (JP); Nozomu Hirokubo, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 436 days.

(21) Appl. No.: 17/557,337

(22) Filed: Dec. 21, 2021

(65) Prior Publication Data

US 2022/0197011 A1 Jun. 23, 2022

(30) Foreign Application Priority Data

Dec. 22, 2020 (JP) ................................ 2020-212170

(51) Int. Cl.
*G02B 26/00* (2006.01)
*G02B 5/28* (2006.01)
*G02B 7/182* (2021.01)

(52) U.S. Cl.
CPC ............. *G02B 26/007* (2013.01); *G02B 5/28* (2013.01); *G02B 7/182* (2013.01); *G02B 26/001* (2013.01)

(58) Field of Classification Search
CPC ........................... G02B 26/007; G02B 26/001
See application file for complete search history.

(56) References Cited

U.S. PATENT DOCUMENTS

2013/0308134 A1* 11/2013 Hirokubo ............. G02B 26/001
359/578

FOREIGN PATENT DOCUMENTS

JP 2013-238755 A 11/2013

* cited by examiner

*Primary Examiner* — Joseph P Martinez
(74) *Attorney, Agent, or Firm* — Oliff PLC

(57) ABSTRACT

Variable wavelength filter including two reflective films facing each other and an actuator group for changing a relative position between the two reflective films is controlled. The actuator group includes a first actuator that is driven according to a target distance between the two reflective films and a second actuator in which a feedback control is performed according to the target distance and a detection value of a distance between the two reflective films. Control method includes (a) receiving a new target distance between the two reflective films, (b) driving the first actuator according to the new target distance, and (c) performing the feedback control on the second actuator according to the new target distance and the detection value of the distance between the two reflective films. When a predetermined condition is satisfied, after start of the (b), and after elapse of a predetermined inhibition time, the (c) is started.

10 Claims, 15 Drawing Sheets

VARIABLE WAVELENGTH FILTER, VARIABLE WAVELENGTH FILTER CONTROL METHOD, AND NON-TRANSITORY COMPUTER-READABLE STORAGE MEDIUM STORING COMPUTER PROGRAM

The present application is based on, and claims priority from JP Application Serial Number 2020-212170, filed Dec. 22, 2020, the disclosure of which is hereby incorporated by reference herein in its entirety.

BACKGROUND

1. Technical Field

The present disclosure relates to a variable wavelength filter, a variable wavelength filter control method, and a non-transitory computer-readable storage medium storing a computer program thereof.

2. Related Art

The Fabry-Perot's etalon is an optical element including two facing reflective surfaces. The Fabry-Perot's etalon, when light enters, transmits the light of a predetermined wavelength with high transmittance. Hereinafter, the Fabry-Perot's etalon will be referred to as an "etalon".

A variable wavelength etalon in JP-A-2013-238755 can change a wavelength of transmitted light by adjusting a distance between two reflective films. The variable wavelength etalon in JP-A-2013-238755 includes a first electrostatic actuator, a second electrostatic actuator, and a movable portion provided with the reflective film and displaced by the first electrostatic actuator and the second electrostatic actuator. The first electrostatic actuator is driven according to a target wavelength of the transmitted light set to various values to displace the movable portion. The second electrostatic actuator is feedback-controlled based on the distance between the two reflective films to displace the movable portion. As a result, the distance between the reflective film held by the movable portion and the reflective film fixed to the movable portion is precisely adjusted. Thereby, the etalon transmits light having a wavelength that exactly matches the target wavelength.

However, in the variable wavelength etalon in JP-A-2013-238755, since the movable portion is displaced by the two actuators and one actuator is feedback-controlled based on the distance between the two reflective films, the following problem arises.

When the target wavelength of the transmitted light is changed, a voltage supplied to the first electrostatic actuator is changed to a value corresponding to the target wavelength. At the same time, a target signal for supplying the target distance between the two reflective films to the second electrostatic actuator is changed. However, the first electrostatic actuator may not complete the displacement of the movable portion immediately after the voltage, which is supplied to the first electrostatic actuator, is changed to the value corresponding to the new target wavelength. That is, immediately after the target wavelength of the transmitted light is changed, the distance between the two reflective films is a value close to the target distance before the change. Therefore, a control section of the second electrostatic actuator receives a deviation between the target signal according to the new target distance between the two reflective films and a detection signal according to an actual distance between the two reflective films, which is close to the previous target distance.

As a result, the control section of the second electrostatic actuator drastically displaces the movable portion so as to eliminate the sudden increase in deviation due to the change in target distance. On the other hand, the first electrostatic actuator also displaces the movable portion in a direction toward a position corresponding to the new target distance according to the supplied voltage. Therefore, the movable portion is excessively displaced from the previous position to the direction toward the position corresponding to the new target distance, and overshoots. A lot of time is spent until this overshoot is eliminated and the fluctuation of the position of the movable portion is sufficiently small. As described above, in the variable wavelength etalon in JP-A-2013-238755, the time required to change the wavelength of the transmitted light may be long.

SUMMARY

According to one embodiment of the present disclosure, there is provided a control method of a variable wavelength filter including two reflective films facing each other and an actuator group configured to change a relative position between the two reflective films. The actuator group includes a first actuator that is driven according to a target distance between the two reflective films and a second actuator in which a feedback control is performed according to the target distance and a detection value of a distance between the two reflective films. The control method includes (a) receiving a new target distance between the two reflective films, (b) changing the relative position between the two reflective films by driving the first actuator according to the new target distance, and (c) changing the relative position between the two reflective films by performing the feedback control on the second actuator according to the new target distance and the detection value of the distance between the two reflective films. When a predetermined condition is satisfied, after start of the (b), and after elapse of a predetermined inhibition time, the (c) is started.

DESCRIPTION OF EXEMPLARY EMBODIMENTS

A. First Embodiment

A1. Configuration of Spectroscopic Measurement Device

Figure 1:
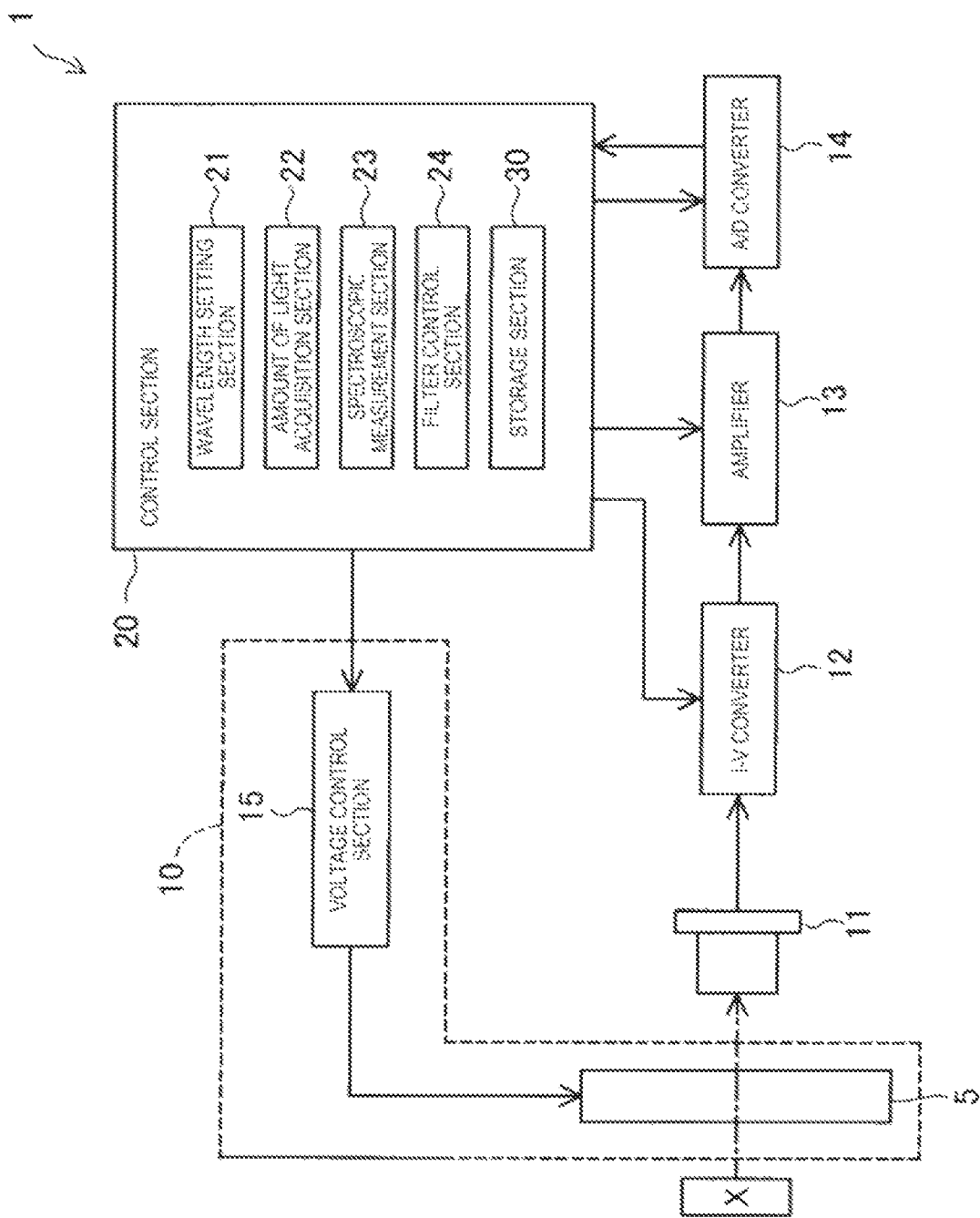
FIG. 1 is a block diagram illustrating a schematic configuration of a spectroscopic measurement device of a first embodiment.

FIG. 1 is a block diagram illustrating a schematic configuration of a spectroscopic measurement device 1 of a first embodiment. The spectroscopic measurement device 1 is an electronic device that analyzes the intensity of light having a predetermined wavelength included in the measurement target light, which is reflected by a measurement target X, and measures a spectral spectrum. The spectroscopic measurement device 1 includes an optical module 10, a detection section 11, an I-V converter 12, an amplifier 13, an A/D converter 14, and a control section 20.

The optical module 10 allows light including components having various wavelengths to enter and transmits light having a target wavelength. The optical module 10 includes a variable wavelength interference filter 5 and a voltage control section 15. The variable wavelength interference filter 5 is an optical element that allows light including components having various wavelengths to enter and transmits light having a specific wavelength. That is, the variable wavelength interference filter 5 is an etalon. The voltage control section 15 can change the wavelength of the light transmitted by the variable wavelength interference filter 5 by controlling the variable wavelength interference filter 5.

The detection section 11 receives the light transmitted through the variable wavelength interference filter 5 of the optical module 10 and outputs a detection signal according to the light intensity of the received light. The detection signal of the detection section 11 is an electric current. The I-V converter 12 converts the detection signal input from the detection section 11 into a voltage and outputs the voltage to the amplifier 13. The amplifier 13 amplifies the voltage input from the I-V converter 12. The voltage output by the amplifier 13 is also referred to as a "detection voltage". The A/D converter 14 converts the detection voltage into a digital signal as an analog signal input from the amplifier 13 and outputs the digital signal to the control section 20. The control section 20 controls each section of the spectroscopic measurement device 1.

A2. Configuration of Optical Module

Figure 2:
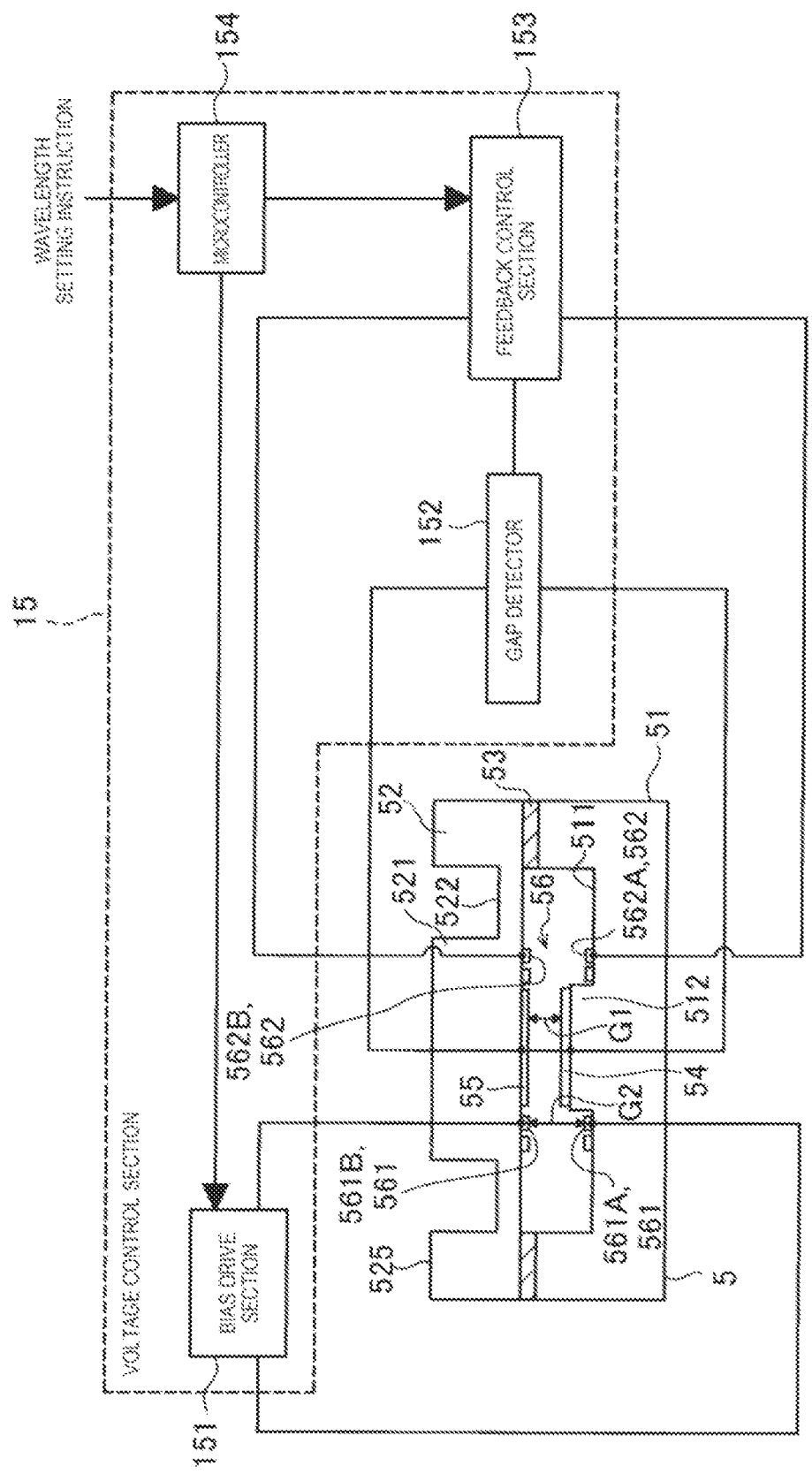
FIG. 2 is a block diagram illustrating a schematic configuration of an optical module.

FIG. 2 is a block diagram illustrating a schematic configuration of the optical module 10. In FIG. 2, the configuration corresponding to the voltage control section 15 is illustrated by being surrounded by a broken line. The variable wavelength interference filter 5 is illustrated in the lower left of the voltage control section 15.

Figure 3:
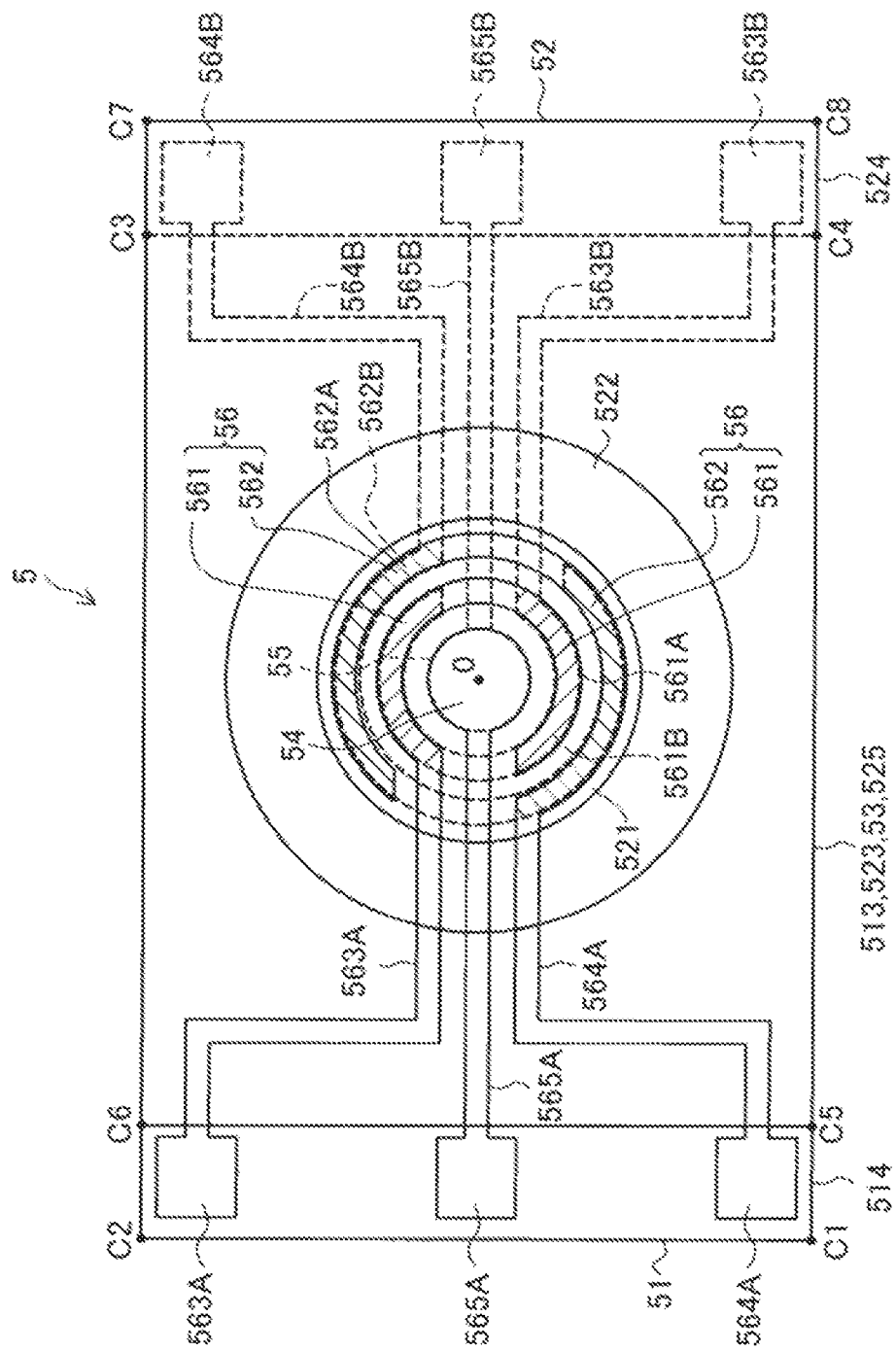
FIG. 3 is a plan view illustrating a schematic configuration of a variable wavelength interference filter of the optical module.

FIG. 3 is a plan view illustrating a schematic configuration of the variable wavelength interference filter of the optical module 10. The variable wavelength interference filter 5 is an optical member with a substantially rectangular parallelepiped form. Four vertices of the variable wavelength interference filter 5 represented in a rectangular form in FIG. 3 are indicated by C1, C2, C7, and C8. The variable wavelength interference filter 5 includes a fixed substrate 51, a movable substrate 52, a bonding film 53, a fixed reflective film 54, a movable reflective film 55, and an electrostatic actuator portion 56.

The fixed substrate 51 supports the fixed reflective film 54 (see the lower left portion in FIG. 2). The fixed substrate 51 is an optical member with a substantially rectangular parallelepiped form. The fixed substrate 51 is made of a material that transmits light, such as various types of glass and quartz crystal. The thickness of the fixed substrate 51 is larger than the thickness of the movable substrate 52. As a result, the fixed substrate 51 does not substantially bend even when subjected to the electrostatic attractive force of the electrostatic actuator portion 56 or the internal stress of the film member formed on the fixed substrate 51. Note that, the thickness of the fixed substrate 51 is measured along a direction perpendicular to the fixed reflective film 54. The detailed configuration of the fixed substrate 51 will be described later.

The movable substrate 52 supports the movable reflective film 55 (see the lower left portion in FIG. 2). The movable substrate 52 is an optical member with a substantially rectangular parallelepiped form. The movable substrate 52 is made of a material that transmits light, such as various types of glass and quartz crystal. The detailed configuration of the movable substrate 52 will be described later.

The bonding film 53 bonds the fixed substrate 51 and the movable substrate 52. Specifically, the bonding film 53 is constituted by a plasma polymerized film containing siloxane as a main component. The bonding film 53 bonds the fixed substrate 51 and the movable substrate 52 at positions that are offset from each other. In FIG. 3, the fixed substrate 51 occupies a region surrounded by vertices C1, C2, C3, and C4. The movable substrate 52 occupies a region surrounded by vertices C5, C6, C7, and C8.

The fixed reflective film 54 receives light from the fixed substrate 51 and the light is reflected between the fixed reflective film 54 and the movable reflective film 55. The fixed reflective film 54 is a film with a substantially circular form having a reflective function and a transmissive function. Specifically, the fixed reflective film 54 is a metal film such as Ag or a conductive alloy film such as Ag alloy.

The movable reflective film 55 is disposed so as to face the fixed reflective film 54. Light is reflected between the fixed reflective film 54 and the movable reflective film 55, and the movable reflective film 55 transmits light having a specific wavelength through the movable substrate 52. The movable reflective film 55 is a film with a substantially circular form having a reflective function and a transmissive function. Specifically, the movable reflective film 55 is a metal film such as Ag or a conductive alloy film such as Ag alloy.

The fixed reflective film 54 and the movable reflective film 55 are disposed in parallel by the fixed substrate 51, the movable substrate 52, and the bonding film 53. In FIG. 2, a space between the fixed reflective film 54 and the movable reflective film 55 is indicated as an inter-reflective film gap G1.

In the present specification, the plan view seen from a direction perpendicular to the fixed reflective film 54 is referred to as a "filter plan view". In the filter plan view, a central point of the fixed reflective film 54 and a central point of the movable reflective film 55 match each other. The central points of the fixed reflective film 54 and the movable reflective film 55 in the filter plan view are referred to as a "filter central point O" (see the center in FIG. 3). A straight line that passes through the filter central point O and is perpendicular to the fixed reflective film 54 is referred to as a "central axis".

The electrostatic actuator portion 56 can change the relative position between the fixed reflective film 54 and the movable reflective film 55. More specifically, the electrostatic actuator portion 56 can change the size of the inter-reflective film gap G1 between the fixed reflective film 54 and the movable reflective film 55 along the central axis direction. The configuration of the electrostatic actuator portion 56 will be described later.

A3. Configuration of Fixed Substrate

Figure 4:
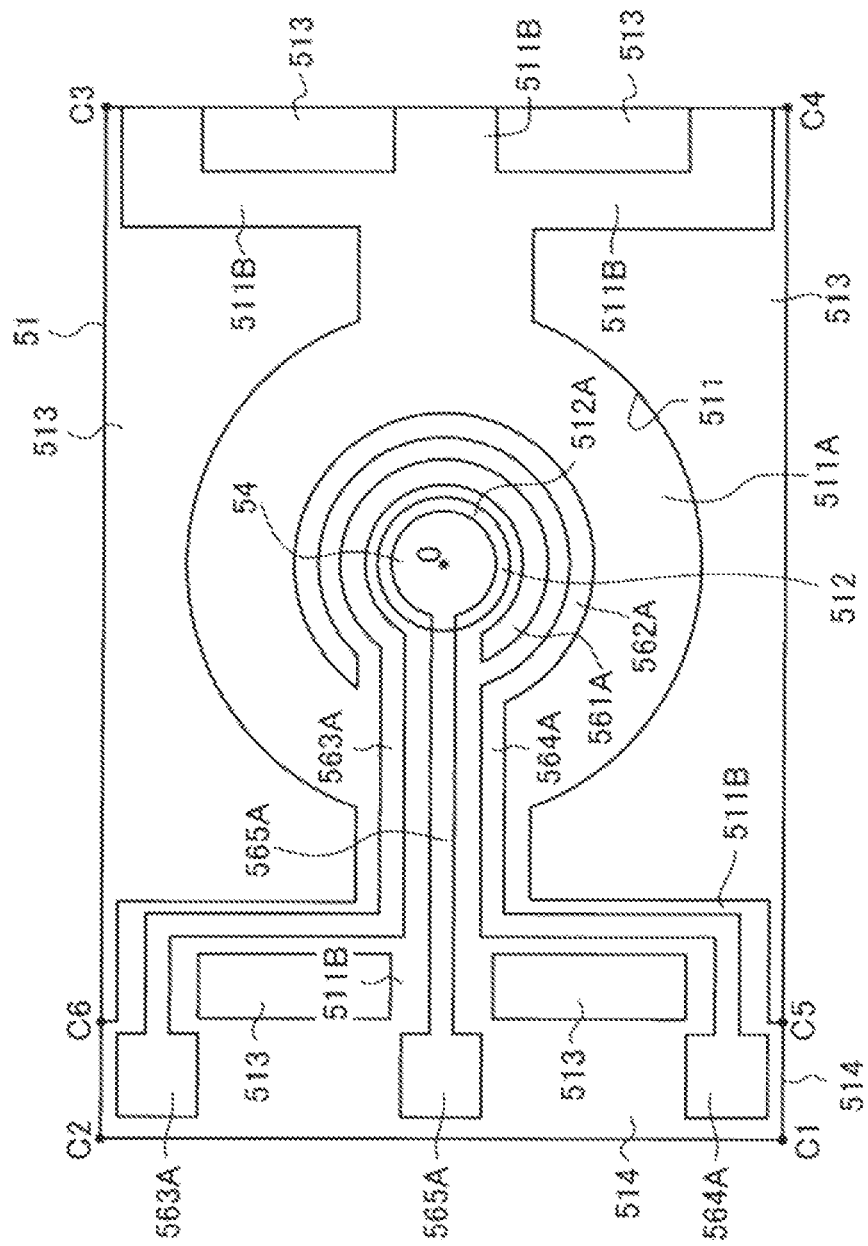
FIG. 4 is a plan view of a fixed substrate as seen from a movable substrate side.

FIG. 4 is a plan view of the fixed substrate 51 as seen from the movable substrate 52 side. As described above, the fixed substrate 51 is an optical member with a substantially rectangular parallelepiped form. The fixed substrate 51 includes an electrode disposition groove 511, an electrode drawing groove 511B, a reflective film installation portion 512, a first bonding portion 513, and a fixed side terminal extraction portion 514 (see FIG. 4).

The electrode disposition groove 511 is a groove provided on a surface of the fixed substrate 51 on a side facing the movable substrate 52 (see the lower left portion in FIG. 2). More specifically, the electrode disposition groove 511 is a groove formed in a ring shape centered on the filter central point O in the filter plan view (see the central portion in FIG. 4). The electrode disposition groove 511 is formed by using, for example, etching or the like. The bottom surface of the electrode disposition groove 511 is referred to as an electrode installation surface 511A. Electrodes of the electrostatic actuator portion 56 are disposed on the electrode installation surface 511A.

The electrode drawing groove 511B is a groove provided on a surface of the fixed substrate 51 on a side facing the movable substrate 52. More specifically, the electrode drawing groove 511B is a groove extending from the electrode disposition groove 511 toward the outer peripheral edge of the fixed substrate 51. The electrode drawing groove 511B is constituted by a groove portion, which extends from the electrode disposition groove 511 toward a side C3-C4 and branches into three, and a groove portion, which extends from the electrode disposition groove 511 toward a side C1-C2 and branches into three. The groove portion, which extends from the electrode disposition groove 511 toward the side C1-C2 and branches into three, is connected to the fixed side terminal extraction portion 514.

The reflective film installation portion 512 is a projection portion provided on a surface of the fixed substrate 51 on a side facing the movable substrate 52 (see the lower left portion in FIG. 2). More specifically, the reflective film installation portion 512 is surrounded by the electrode disposition groove 511 and has a structure with a substantially cylindrical shape protruding toward the movable substrate 52. The top end surface of the cylinder of the reflective film installation portion 512 is referred to as a reflective film installation surface 512A. The fixed reflective film 54 is disposed on the reflective film installation surface 512A.

The first bonding portion 513 is bonded to the movable substrate 52 by the bonding film 53. Of the surface of the fixed substrate 51 with a substantially rectangular parallelepiped form facing the movable substrate 52, the first bonding portion 513 is a surface on which the electrode disposition groove 511, the reflective film installation portion 512, and the electrode drawing groove 511B are not formed.

The fixed side terminal extraction portion 514 is a portion that does not overlap with the movable substrate 52 in the filter plan view in a state where the variable wavelength interference filter 5 is configured. The movable substrate occupies a region represented in a rectangular form surrounded by the vertices C5, C6, C7, and C8 in FIG. 3. The fixed side terminal extraction portion 514 is a portion represented in a rectangular form surrounded by the vertices C1, C2, C6, and C5 in FIG. 3.

A4. Configuration of Movable Substrate

Figure 5:
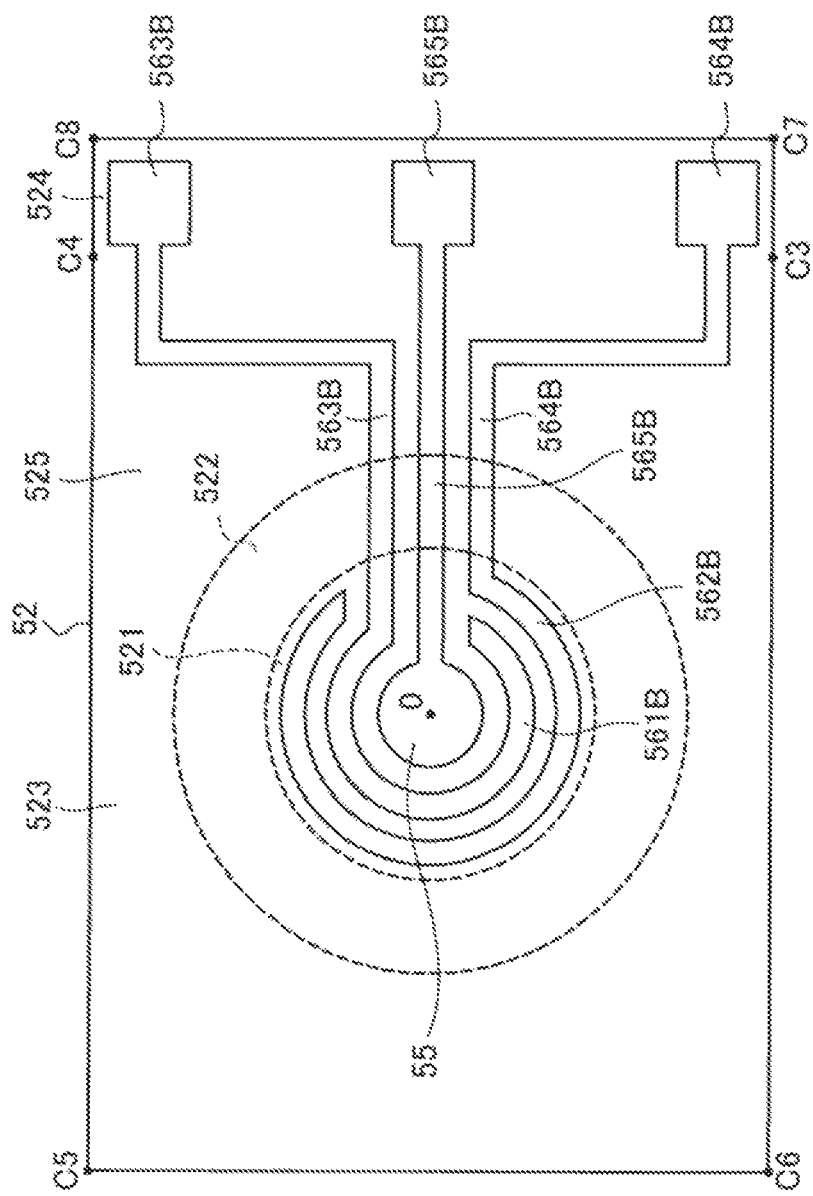
FIG. 5 is a plan view of the movable substrate as seen from the fixed substrate side.

FIG. 5 is a plan view of the movable substrate 52 as seen from the fixed substrate 51 side. As described above, the movable substrate 52 is an optical member with a substantially rectangular parallelepiped form. The movable substrate 52 includes a movable portion 521, a holding portion 522, a second bonding portion 523, a movable side terminal extraction portion 524, and an outer peripheral portion 525 of the substrate (see FIGS. 3 and 5).

The movable portion 521 is a projection portion provided on a surface of the movable substrate 52 on the side opposite to that of the fixed substrate 51 (see the lower left portion in FIG. 2). More specifically, the movable portion 521 has a structure with a substantially cylindrical shape that is surrounded by the holding portion 522 and protrudes from the holding portion 522 toward the side opposite to the fixed substrate 51. In the filter plan view, the region occupied by the movable portion 521 includes a region occupied by the reflective film installation portion 512 and the reflective film installation surface 512A of the reflective film installation portion 512 (see the lower left portion in FIG. 2). A movable reflective film 55 is disposed on the bottom surface of the movable portion 521 on the fixed substrate 51 side. A bandpass filter that transmits only light having a wavelength in a certain range is disposed on the side opposite to the fixed reflective film 54 with respect to the movable reflective film 55.

The holding portion 522 is a groove provided on the surface of the movable substrate 52 on the side opposite to that of the fixed substrate 51 (see the lower left portion in FIG. 2). The holding portion 522 is disposed at a position surrounding the movable portion 521. More specifically, the holding portion 522 is a recess portion formed in a ring shape centered on the filter central point O in the filter plan view (see the central portion in FIG. 5). The thickness of the holding portion 522 is smaller than the thickness of the movable portion 521. The holding portion 522 is elastically deformed to displace the movable portion 521 along the central axis direction. As a result, the movable portion 521 is displaced with respect to the fixed substrate 51 along the central axis direction. That is, the holding portion 522 is a diaphragm for displacing the movable portion 521. The fixed reflective film 54 and the movable reflective film 55 are maintained in a parallel state in the displacement along the central axis direction of the movable portion 521.

The second bonding portion 523 is bonded to the fixed substrate 51 by the bonding film 53. Of the surface of the movable substrate 52 with a substantially rectangular parallelepiped form facing the fixed substrate 51, the second bonding portion 523 is a region that faces the first bonding portion 513 of the fixed substrate 51.

The movable side terminal extraction portion 524 is a portion that does not overlap with the fixed substrate 51 in the filter plan view in a state where the variable wavelength interference filter 5 is configured. The fixed substrate 51 occupies a region represented in a rectangular form surrounded by the vertices C1, C2, C3, and C4 in FIG. 3. The movable side terminal extraction portion 524 is a portion represented in a rectangular form surrounded by the vertices C4, C3, C7, and C8 in FIG. 3.

Of the surface of the movable substrate 52 with a substantially rectangular parallelepiped form facing the fixed substrate 51, the outer peripheral portion 525 of the substrate is a region that surrounds the holding portion 522 in the filter plan view. The outer peripheral portion 525 of the substrate includes the second bonding portion 523.

A5. Configuration of Electrostatic Actuator Portion

The electrostatic actuator portion 56 includes a first electrostatic actuator 561, a second electrostatic actuator 562, a first drawing electrode 563A, a second drawing electrode 563B, a third drawing electrode 564A, and a fourth drawing electrode 564B, a fifth drawing electrode 565A, and a sixth drawing electrode 565B (see FIG. 3).

The first electrostatic actuator 561 has a function of roughly controlling the size of the inter-reflective film gap G1 between the fixed reflective film 54 and the movable reflective film 55. The first electrostatic actuator 561 is driven by a bias voltage, which is a fixed value, according to a target distance G1$t$ of the inter-reflective film gap G1 between the fixed reflective film 54 and the movable reflective film 55. The first electrostatic actuator 561 includes a first electrode 561A and a second electrode 561B.

The first electrode 561A is disposed at a position surrounding the reflective film installation portion 512 inside the electrode disposition groove 511 of the fixed substrate 51 (see the lower left portion in FIG. 2). More specifically, the first electrode 561A is disposed in an arc shape on the electrode installation surface 511A of the electrode disposition groove 511 at a position surrounding the reflective film installation portion 512 (see the central portion in FIG. 4). The first electrode 561A is disposed at a position facing the bottom surface of the movable portion 521 in a state where the variable wavelength interference filter 5 is configured (see the lower left portion in FIG. 2).

The second electrode 561B is disposed at a position surrounding the movable reflective film 55 on the surface of the movable substrate 52 facing the fixed substrate 51 (see the lower left portion in FIG. 2). More specifically, the second electrode 561B is disposed in an arc shape on the bottom surface of the movable portion 521 at a position surrounding the movable reflective film 55 (see the central portion in FIG. 5). The first electrode 561A and the second electrode 561B face each other in a state where the variable wavelength interference filter 5 is configured (see the lower left portion in FIG. 2). In FIG. 2, a space between the first electrode 561A and the second electrode 561B is illustrated as an inter-electrode gap G2.

The second electrostatic actuator 562 has a function of precisely controlling the size of the inter-reflective film gap G1 between the fixed reflective film 54 and the movable reflective film 55. A feedback control is performed on the second electrostatic actuator 562 according to the target distance G1$t$ of the inter-reflective film gap G1 and the detection value G1$d$ of the distance of the inter-reflective film gap G1. The second electrostatic actuator 562 includes a third electrode 562A and a fourth electrode 562B.

The third electrode 562A is disposed at a position surrounding the first electrode 561A inside the electrode disposition groove 511 of the fixed substrate 51 (see the lower left portion in FIG. 2). More specifically, the third electrode 562A is disposed in an arc shape on the electrode installation surface 511A of the electrode disposition groove 511 at a position surrounding the first electrode 561A (see the central portion in FIG. 4). The third electrode 562A is disposed at a position facing the bottom surface of the movable portion 521 in a state where the variable wavelength interference filter 5 is configured (see the lower left portion in FIG. 2).

The fourth electrode 562B is disposed at a position surrounding the second electrode 561B on the surface of the movable substrate 52 facing the fixed substrate 51 (see the lower left portion in FIG. 2). More specifically, the fourth electrode 562B is disposed in an arc shape on the bottom surface of the movable portion 521 at a position surrounding the second electrode 561B (see the central portion in FIG. 5). The third electrode 562A and the fourth electrode 562B face each other in a state where the variable wavelength interference filter 5 is configured (see the lower left portion in FIG. 2). In FIG. 2, the size of the space between the third electrode 562A and the fourth electrode 562B is the same as the size of the space between the first electrode 561A and the second electrode 561B (see G2 at the lower left portion in FIG. 2).

The first drawing electrode 563A, the third drawing electrode 564A, and the fifth drawing electrode 565A are electrodes provided on the surface of the fixed substrate 51 on a side facing the movable substrate 52 (see FIG. 4). The first drawing electrode 563A extends from one end of the first electrode 561A to the vicinity of the vertex C2. The third drawing electrode 564A extends from one end of the third electrode 562A to the vicinity of the vertex C1. The fifth drawing electrode 565A extends from the fixed reflective film 54 to the vicinity of the midpoint of the side C1-C2. Of the electrode drawing groove 511B, the first drawing electrode 563A, the third drawing electrode 564A, and the fifth drawing electrode 565A are disposed inside a groove portion that extends from the electrode disposition groove 511 toward the side C1-C2 and branches into three.

The top end portion of the first drawing electrode 563A, the top end portion of the third drawing electrode 564A, and the top end portion of the fifth drawing electrode 565A, which are respectively disposed in the vicinity of the outer edge of the fixed substrate 51, are positioned inside the fixed side terminal extraction portion 514 (see the left portion in FIG. 3). The top end portion of the first drawing electrode 563A, the top end portion of the third drawing electrode 564A, and the top end portion of the fifth drawing electrode 565A are coupled to the voltage control section 15 by, for example, flexible printed circuits (FPC), a lead wire, or the like.

In FIG. 3, the fixed reflective film 54, the first electrode 561A, the third electrode 562A, the first drawing electrode 563A, the third drawing electrode 564A, and the fifth drawing electrode 565A, which are provided on the fixed substrate 51, are illustrated by a solid line.

The second drawing electrode 563B, the fourth drawing electrode 564B, and the sixth drawing electrode 565B are electrodes provided on the surface of the movable substrate 52 on a side facing the fixed substrate 51 (see FIG. 5). The second drawing electrode 563B extends from one end of the second electrode 561B to the vicinity of the vertex C8. The fourth drawing electrode 564B extends from one end of the fourth electrode 562B to the vicinity of the vertex C7. The sixth drawing electrode 565B extends from the movable reflective film 55 to the vicinity of the midpoint of the side C7-C8. Of the electrode drawing groove 511B of the fixed substrate 51, the second drawing electrode 563B, the fourth drawing electrode 564B, and the sixth drawing electrode 565B are disposed at positions that overlaps with the groove portion extending from the electrode disposition groove 511 toward the side C3-C4 and branching into three, in a state where the variable wavelength interference filter 5 is configured.

The top end portion of the second drawing electrode 563B, the top end portion of the fourth drawing electrode 564B, and the top end portion of the sixth drawing electrode 565B, which are respectively disposed in the vicinity of the outer edge of the movable substrate 52, are positioned inside the movable side terminal extraction portion 524 (see the right portion in FIG. 3). The top end portion of the second drawing electrode 563B, the top end portion of the fourth drawing electrode 564B, and the top end portion of the sixth drawing electrode 565B are coupled to the voltage control section 15 by, for example, the flexible printed circuits (FPC), the lead wire, or the like.

In FIG. 3, the movable reflective film 55, the second electrode 561B, the fourth electrode 562B, the second drawing electrode 563B, the fourth drawing electrode 564B, and the sixth drawing electrode 565B, which are provided on the movable substrate 52, are illustrated by a broken line.

A6. Configuration of Voltage Control Section

The voltage control section 15 includes a bias drive section 151, a gap detector 152, a feedback control section 153, and a microcontroller 154 (see FIG. 2). Note that, in the drawings, the microcontroller 154 is referred to as a "microcomputer".

The bias drive section 151 drives the first electrostatic actuator 561 of the variable wavelength interference filter 5 based on the bias signal input from the microcontroller 154. The bias drive section 151 is coupled to the first electrode 561A of the first electrostatic actuator 561 via the first drawing electrode 563A (see the upper left portion and the central portion in FIG. 3). The bias drive section 151 is coupled to the second electrode 561B of the first electrostatic actuator 561 via the second drawing electrode 563B (see the lower right portion and the central portion in FIG. 3). The bias drive section 151 applies a bias voltage to the first electrode 561A and the second electrode 561B of the first electrostatic actuator 561.

Specifically, the bias drive section 151 is constituted by a D/A converter having a predetermined number of bits. The bias drive section 151 applies a voltage corresponding to the bias signal input from the microcontroller 154 to the first electrostatic actuator 561.

The gap detector 152 is coupled to the fixed reflective film 54 via the fifth drawing electrode 565A (see the middle left portion and the central portion in FIG. 3). The gap detector 152 is coupled to the movable reflective film 55 via the sixth drawing electrode 565B (see the middle right portion and the central portion in FIG. 3). The gap detector 152 acquires a detection signal corresponding to the detection value $G1d$ of the distance of the inter-reflective film gap G1 between the fixed reflective film 54 and the movable reflective film 55, and outputs the detection signal Vx to the feedback control section 153.

The feedback control section 153 performs a feedback control of the second electrostatic actuator 562. More specifically, the feedback control section 153 includes a feedback drive section 156 as a functional section. The feedback drive section 156 performs the feedback control on the second electrostatic actuator 562 so that the detection signal Vx, which is input from the gap detector 152, and the target detection signal Vr, which is input from the microcontroller 154, have the same value. The feedback control section 153 is a digital processor controlled by the control section 20 and performing various functions described later, in addition to functioning as a controller that performs the feedback control on the second electrostatic actuator 562. Therefore, the feedback control section 153 is also referred to as a feedback processor. Further, the feedback drive section 156 is also referred to as a feedback drive processor.

The feedback control section 153 is coupled to the third electrode 562A of the second electrostatic actuator 562 via the third drawing electrode 564A (see the lower left portion and the central portion in FIG. 3). The feedback control section 153 is coupled to the fourth electrode 562B of the second electrostatic actuator 562 via the fourth drawing electrode 564B (see the upper right portion and the central portion in FIG. 3). The feedback control section 153 applies the feedback voltage Vu to the third electrode 562A and the fourth electrode 562B of the second electrostatic actuator 562.

The feedback control section 153 functions as a controller such as a PI controller, a PD controller, or a PID controller in response to an instruction from the control section 20, for example. The feedback control section 153 has a voltage variable range set to a predetermined width. The feedback control section 153 applies the feedback voltage Vu to the second electrostatic actuator 562 so that the detection signal Vx, which is input from the gap detector 152, and the target detection signal Vr, which is input from the microcontroller 154, have the same value.

The microcontroller 154 is coupled to the control section 20, the bias drive section 151, the gap detector 152, and the feedback control section 153. The microcontroller 154 controls the bias drive section 151, the gap detector 152, and the feedback control section 153 based on the control signal input from the control section 20, and transmits light having a target wavelength from the variable wavelength interference filter 5.

The microcontroller 154 includes a storage unit. In the storage unit, for example, gap correlation data in which the amount of the gap of the inter-reflective film gap G1 and the detection signal Vx detected by the gap detector 152 are associated with each other is stored. The microcontroller 154 controls the bias drive section 151, the gap detector 152, and the feedback control section 153 with reference to the gap correlation data based on the control signal input from the control section 20, and transmits light having a target wavelength from the variable wavelength interference filter 5.

A7. Configuration of Control Section

The control section 20 is a computer having a processor, a volatile memory, a non-volatile memory, and an I/O interface. Each of these sections is coupled via a bus. The processor is, for example, a microprocessor or a processor circuit. The processor realizes various functions of the spectroscopic measurement device 1 by executing various program instructions stored in advance in the non-volatile memory. The control section 20 includes a wavelength setting section 21, an amount of light acquisition section 22, a spectroscopic measurement section 23, and a filter control section 24 as functional sections (see FIG. 1). The volatile memory and the non-volatile memory included in the control section 20 are collectively illustrated in FIG. 1 as a "storage section 30".

The wavelength setting section 21 sets a target wavelength of light extracted by the variable wavelength interference filter 5. The filter control section 24 outputs the control signal for transmitting the light having the set target wavelength through the variable wavelength interference filter 5 to the voltage control section 15. The amount of light acquisition section 22 acquires the amount of light having the target wavelength transmitted through the variable wavelength interference filter 5 based on the amount of light acquired by the detection section 11. The spectroscopic measurement section 23 acquires the spectral characteristics of the measurement target light based on the amount of light acquired by the amount of light acquisition section 22.

A8. Driving Method of Variable Wavelength Interference Filter

Figure 6:
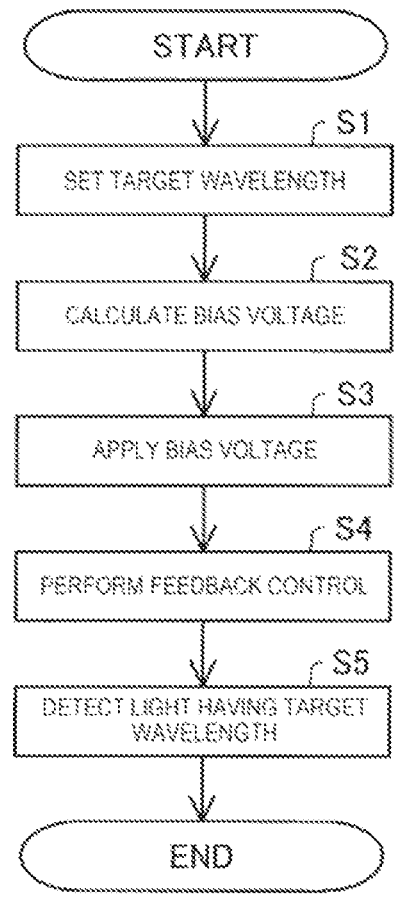
FIG. 6 is a flowchart illustrating a driving method of a variable wavelength interference filter.

FIG. 6 is a flowchart illustrating a driving method of the variable wavelength interference filter in the spectroscopic measurement process of the spectroscopic measurement device 1. By the process in FIG. 6, the intensity of the light having a specific wavelength included in the measurement target light from the measurement target X is acquired (see FIG. 1).

In step S1 in FIG. 6, the wavelength setting section 21 of the control section 20 sets the target wavelength of the light transmitted through the variable wavelength interference filter 5 (see the upper right portion in FIG. 1). The filter control section 24 of the control section 20 outputs the control signal indicating that the light having the set target wavelength is transmitted, to the voltage control section 15 (see the upper central portion in FIG. 1).

In step S2, the microcontroller 154 of the voltage control section 15 calculates the bias voltage Vb corresponding to the target wavelength according to the control signal input from the control section 20 (see the upper right portion in FIG. 2). As the bias voltage Vb, one voltage is defined with respect to the target wavelength. In FIG. 2, information on the target wavelength represented by the control signal from the control section 20 is indicated as a "wavelength setting instruction".

The microcontroller 154 sets the bias voltage Vb so that the sensitivity when the voltage is applied to the second electrostatic actuator 562 becomes constant in the feedback control by the feedback control section 153. The sensitivity Rc [m/V] when the voltage is applied to the second electrostatic actuator 562 is represented by the equation (1).

[Math. 1]

$$R_c = \frac{\{2k\varepsilon S_c d(d_{max} - d)^2 - \varepsilon^2 S_c S_b V_b^2\}^{1/2}}{k(d_{max} - d)(d_{max} - 3d)} \quad (1)$$

Where Vb is a bias voltage applied to the first electrostatic actuator 561.

k is a spring coefficient of the holding portion 522 of the movable substrate 52.

$\varepsilon$ is a dielectric constant of the inter-electrode gap G2 between the fixed substrate 51 and the movable substrate 52.

Sb is an area of the region where the first electrode 561A and the second electrode 561B overlap each other in the filter plan view, that is, the region that functions as the first electrostatic actuator 561.

Sc is an area of the region where the third electrode 562A and the fourth electrode 562B overlap each other in the filter plan view, that is, the region that functions as the second electrostatic actuator 562.

dmax is an initial amount of the gap of the inter-electrode gap G2, that is, the amount of the gap in a state where no voltage is applied.

d is an amount of displacement of the movable portion 521 for transmitting the light having the target wavelength, that is, the amount of gap displacement of the inter-electrode gap G2.

Figure 7:
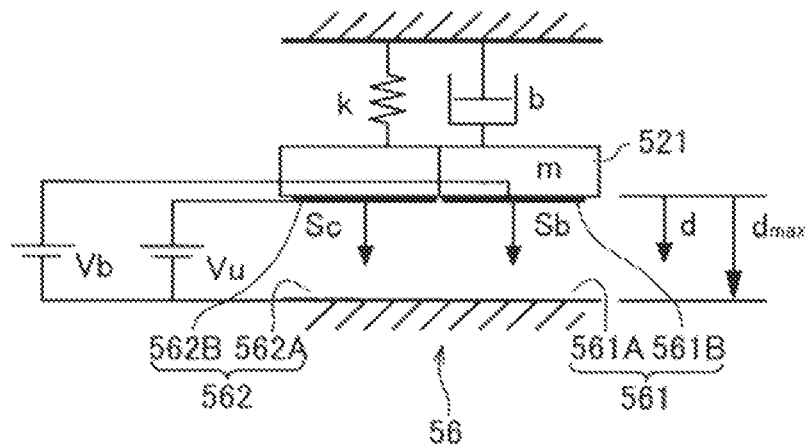
FIG. 7 is an equivalent circuit model of an electrostatic actuator portion.

FIG. 7 illustrates an equivalent circuit model of the electrostatic actuator portion 56. In FIG. 7, k indicates an elastic modulus. b indicates a damping coefficient. m indicates amass coefficient. Vb is a voltage between the first electrode 561A and the second electrode 561B. Vu is a voltage between the third electrode 562A and the fourth electrode 562B.

In step S2 in FIG. 6, in the feedback control, the bias voltage Vb is applied so that the sensitivity when the voltage is applied to the second electrostatic actuator 562 becomes constant. That is, in the above equation (1), Rc is a constant value. As Rc, a value set in advance corresponding to the gain in the controller of the feedback control section 153 is used. When the control signal for designating the target wavelength is input from the control section 20, the microcontroller 154 calculates the amount of the target gap of the inter-reflective film gap G1 that is for transmitting the light having the target wavelength through the variable wavelength interference filter 5. The amount of the target displacement d, which is used for displacing the movable portion 521, can be calculated by using the amount of the target gap.

When the above equation (1) is solved for Vb, the equation (2) is obtained.

[Math. 2]

$$V_b \left[ \frac{k}{\varepsilon S_b} \left\{ 2d(d_{max} - d)^2 - \frac{kR_c^2(d_{max} - d)^2(d_{max} - 3d)^2}{\varepsilon S_c} \right\} \right]^{1/2} \quad (2)$$

In step S2 in FIG. 6, the microcontroller 154 calculates the voltage applied to the first electrostatic actuator 561, that is, the bias voltage Vb, based on the equation (2).

In step S3, the microcontroller 154 outputs the bias signal obtained based on the bias voltage Vb calculated in step S2, to the bias drive section 151 (see the upper portion in FIG. 2). The bias drive section 151 applies the bias voltage Vb corresponding to the bias signal to the first electrostatic actuator 561. As a result, the electrostatic attractive force obtained based on the bias voltage Vb acts between the first electrode 561A and the second electrode 561B of the first electrostatic actuator 561, and the movable portion 521 is displaced to the fixed substrate 51 side.

Figure 8A:
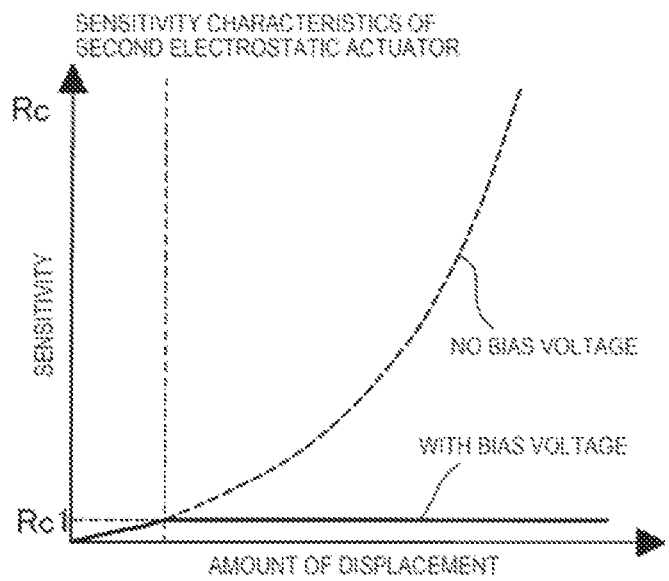
FIG. 8A is a diagram representing the characteristics of sensitivity of a second electrostatic actuator to which a feedback voltage is applied.

FIG. 8A is a diagram representing the characteristics of sensitivity of the second electrostatic actuator 562 to which the feedback voltage Vu is applied. In FIG. 8A, the horizontal axis is the amount of the displacement of the movable portion 521. In FIG. 8A, the graph represented by the broken line represents the sensitivity of the second electrostatic actuator 562 in a state where the bias voltage Vb is not applied to the first electrostatic actuator 561.

The sensitivity of the second electrostatic actuator 562 changes greatly with respect to the amount of displacement in a state where the bias voltage is not applied to the first electrostatic actuator 561. More specifically, as the amount of displacement increases, the sensitivity increases. When the sensitivity of the electrostatic actuator that applies the feedback voltage Vu is changed, even when the gain of the controller of the feedback control section 153 is set according to a certain specific sensitivity, since the sensitivity is greatly different where the amount of the displacement of the movable portion 521 is different, the controller does not function properly. That is, in a state where the bias voltage is not applied, the controller functions properly only in the vicinity of the gap in which the gain is set.

Figure 8B:
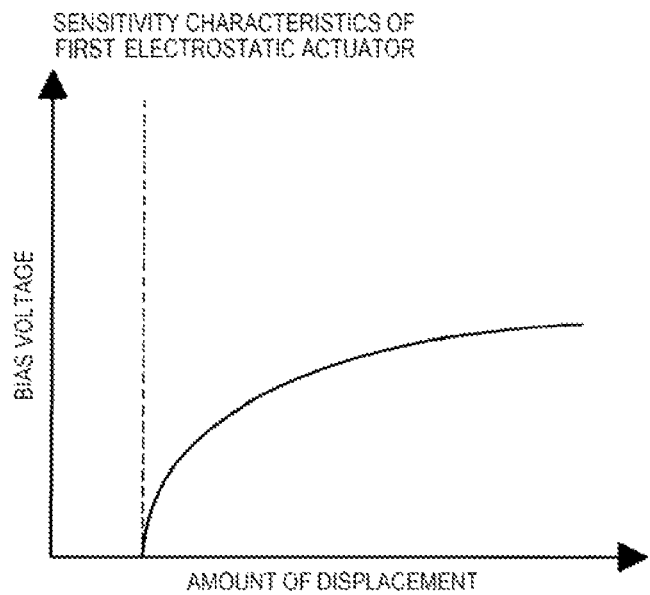
FIG. 8B is a diagram representing a bias voltage applied to a first electrostatic actuator.

FIG. 8B is a diagram representing the bias voltage Vb that is applied to the first electrostatic actuator 561 based on the equation (2). In FIG. 8B, the horizontal axis is the amount of the displacement of the movable portion 521. The range indicated by the horizontal axis in FIG. 8B and the range indicated by the horizontal axis in FIG. 8A are the same. In the present embodiment, the bias voltage Vb based on the equation (2) is applied to the first electrostatic actuator 561 (see FIG. 8B). As a result, the sensitivity of the second electrostatic actuator 562 indicates the characteristics represented by the graph represented by the thick solid line in FIG. 8A. That is, the sensitivity of the second electrostatic actuator 562 becomes a constant value Rc1 in most regions.

In step S4 in FIG. 6, the feedback control is performed by the feedback control section 153. The microcontroller 154 applies a high-frequency voltage for an electrostatic capacitance detection to the fixed reflective film 54 and the movable reflective film 55 by controlling the gap detector 152 (see the central portion in FIG. 2). The gap detector 152 acquires the detection signal according to the electrostatic capacitance of the fixed reflective film 54 and the movable reflective film 55. The gap detector 152 outputs the acquired detection signal Vx to the feedback control section 153.

The microcontroller 154 calculates the amount of the target gap corresponding to the target wavelength based on the control signal from the control section 20 (see the upper right portion in FIG. 2). The microcontroller 154 acquires the target detection signal Vr corresponding to the amount of the target gap from the gap correlation data stored in the storage unit, and outputs the target detection signal Vr to the feedback control section 153.

The feedback control section 153 calculates a difference between the target detection signal Vr, which is input from the microcontroller 154, and the detection signal Vx, which is input from the gap detector 152, and applies the feedback voltage Vu to the second electrostatic actuator 562 so that the difference becomes "0" (see the lower right portion in FIG. 2).

In step S5 in FIG. 6, the detection section 11 detects the light transmitted through the variable wavelength interference filter 5 and outputs the detection signal (see the lower left portion in FIG. 1). The information representing the intensity of the light is input to the control section 20 via the I-V converter 12, the amplifier 13, and the A/D converter 14. The amount of light acquisition section 22 of the control section 20 acquires the amount of light having the target wavelength transmitted through the variable wavelength interference filter 5 based on the received information about the amount of light.

In the above, a process of transmitting the light having one wavelength in the variable wavelength interference filter 5 and detecting the amount of light has been described by using the flowchart in FIG. 6. By sequentially changing the wavelength set in step S1 in FIG. 6 and repeating the process in FIG. 6, the spectral spectrum of the measurement target light can be measured by using the amount of light for each wavelength within a predetermined wavelength range included in the measurement target light from the measurement target X.

Figure 9:
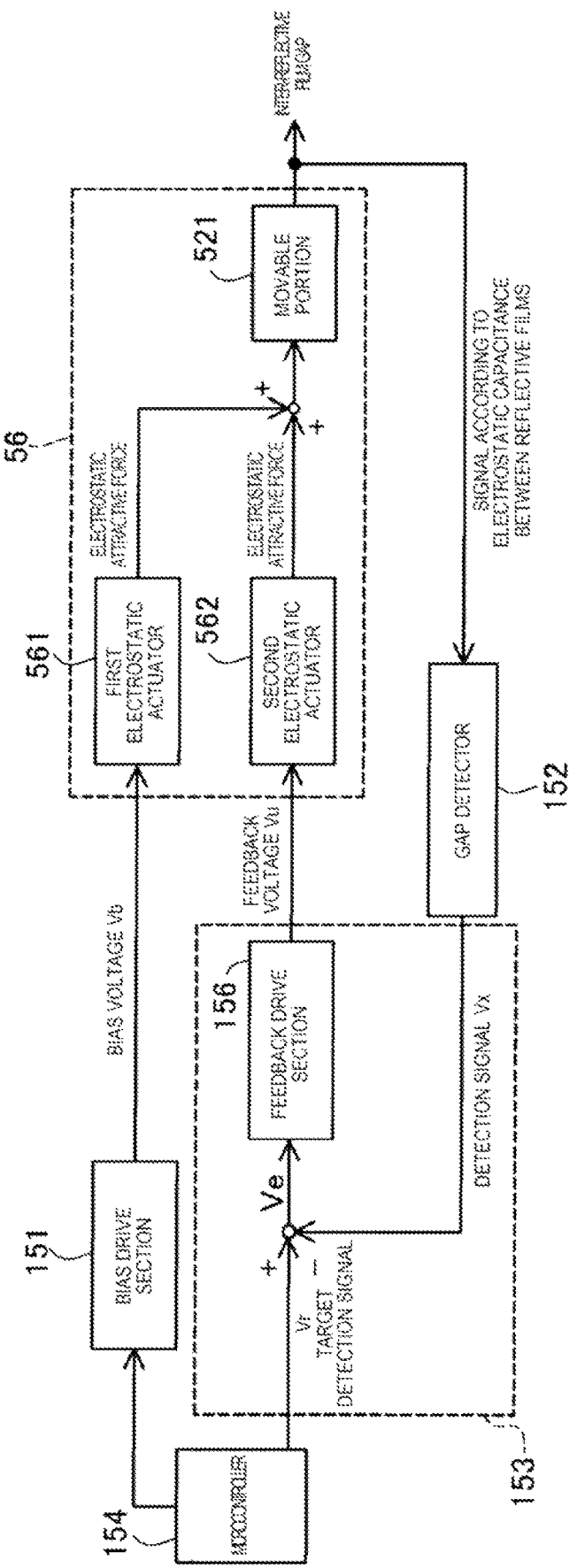
FIG. 9 is a block diagram illustrating the content of a feedback control executed in step S4 in FIG. 6.

FIG. 9 is a block diagram illustrating the content of the feedback control executed in step S4 in FIG. 6. The bias drive section 151 of the voltage control section 15 applies the bias voltage Vb that makes the sensitivity of the second electrostatic actuator 562 constant to the first electrostatic actuator 561 (see the upper portion in FIG. 9 and FIG. 8B). Therefore, the feedback control section 153 of the voltage control section 15 can drive the second electrostatic actuator 562 with low sensitivity regardless of the amount of the displacement of the movable portion 521, that is, the amount of change in the inter-electrode gap G2 (see FIG. 8A).

The feedback control section 153 includes the feedback drive section 156 as a functional section. The feedback drive section 156 sets the feedback voltage Vu applied to the second electrostatic actuator 562 based on the deviation Ve of the target detection signal Vr, which is input from the microcontroller 154, and the detection signal Vx, which is output from the gap detector 152, so that the deviation Ve becomes 0 (see the lower left portion in FIG. 9).

Figure 10:
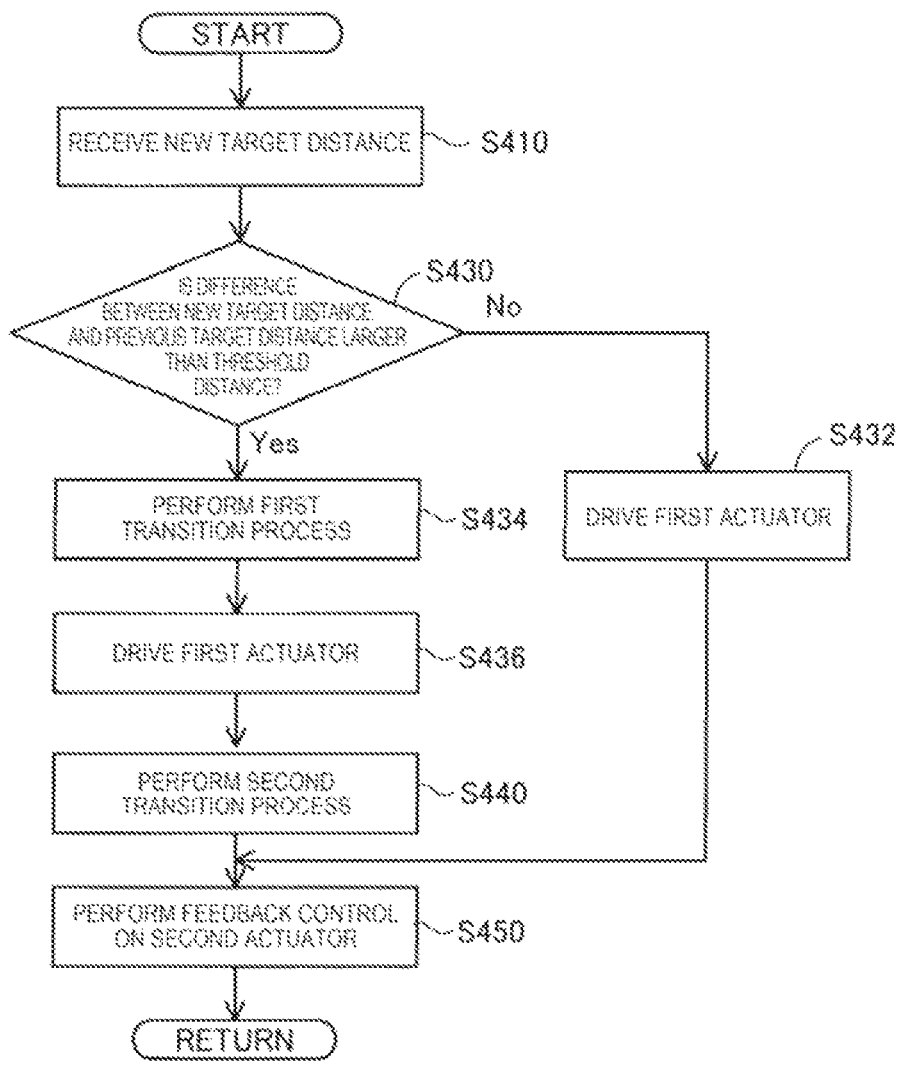
FIG. 10 is a flowchart illustrating a process of a control method of the variable wavelength interference filter.

FIG. 10 is a flowchart illustrating a process of a control method of the variable wavelength interference filter 5. In step S410, the filter control section 24 of the control section 20 receives a target value of the inter-reflective film gap G1, that is, a new target distance G1t between the fixed reflective film 54 and the movable reflective film 55 from the wavelength setting section 21 of the control section 20 (see the upper right portion in FIG. 1). As described above, the filter control section 24 outputs the control signal of the target wavelength to the voltage control section 15. As a result, the voltage control section 15 receives the target value of the inter-reflective film gap G1, that is, the new target distance G1t between the fixed reflective film 54 and the movable reflective film 55.

In step S430, the voltage control section 15 determines whether or not a difference between the new target distance G1t between the fixed reflective film 54 and the movable reflective film 55 and the previous target distance between the fixed reflective film 54 and the movable reflective film 55, is larger than a predetermined threshold distance. The specific determination is made using the bias voltage Vb set according to the target distance. When the difference between the new target distance G1t and the target distance immediately before the change is larger than the predetermined threshold distance, the process proceeds to step S434. When the difference between the target distances is equal to or less than the predetermined threshold distance, the process proceeds to step S432.

In step S432, as described above, the bias drive section 151 of the voltage control section 15 displaces the movable reflective film 55 by driving the first electrostatic actuator 561 according to the new target distance G1t (see the upper portion in FIG. 9). As a result, the relative position between the fixed reflective film 54 and the movable reflective film 55 changes. After that, the process proceeds to step S450.

On the other hand, in step S434, the first transition process is performed. In the present embodiment, the feedback control section 153 waits for the feedback control by the feedback drive section 156 for a predetermined inhibition time Ts after the start of the process of step S434. In the first transition process, the feedback control section 153 starts waiting for the feedback control by the feedback drive section 156. Further, the feedback control section 153 acquires the drive voltage Vu output to the second electrostatic actuator 562 by the feedback drive section 156 immediately before the waiting (see the middle central portion in FIG. 9).

In step S436, the bias drive section 151 of the voltage control section 15 displaces the movable reflective film 55 by driving the first electrostatic actuator 561 according to the new target distance G1t (see the upper portion in FIG. 9). The process of step S436 is the same as the process of step S432.

In step S440, a second transition process is performed. In the present embodiment, after the start of the process of step S436, the feedback control section 153 waits for the feedback control until the predetermined inhibition time Ts elapses. After the start of the process of step S436, and after the elapse of a predetermined inhibition time Ts, the process of step S450 is started.

The inhibition time Ts is ¼ time of the cycle of the natural vibration of a configuration that includes the movable portion 521 displaced by the first electrostatic actuator 561 in the variable wavelength interference filter 5.

After the start of the process of step S436, at the timing when the ¼ time of the cycle of the natural vibration of the above configuration elapses, it can be estimated that the relative distance between the fixed reflective film 54 and the movable reflective film 55, which is changed by the first electrostatic actuator 561, is closest to the target distance G1t in the first cycle of the natural vibration. Therefore, by setting the inhibition time Ts to ¼ time of the cycle of the natural vibration, the feedback control of the movable portion 521 can be resumed from the state where the relative distance between the fixed reflective film 54 and the movable reflective film 55 is close to the target distance G1t. Therefore, as compared with the aspect in which the inhibition time Ts is another time, the time required for the fixed reflective film 54 and the movable reflective film 55 to transition to the relative position, where the fixed reflective film 54 and the movable reflective film 55 face each other with a new target distance G1t apart, and stabilize, can be shortened.

After the start of the process of step S436, and before the start of step S450, the feedback drive section 156 of the feedback control section 153 does not perform the calculation of the feedback control. After the start of the process of step S410, in step S434, the drive voltage Vu having the same magnitude as the drive voltage Vu, which is supplied from the feedback drive section 156 immediately before the start of the waiting of the feedback drive section 156, is applied to the second electrostatic actuator 562 from the feedback drive section 156.

By performing such a process, after the start of the process of step S436, and before the start of the process of step S450, it is possible to stabilize the control of the relative position between the fixed reflective film 54 and the movable reflective film 55.

In step S450, the feedback control section 153 of the voltage control section 15 performs the feedback control on the second electrostatic actuator 562 according to the new target distance G1t and the detection value G1d of the distance of the inter-reflective film gap G1. More specifically, the feedback drive section 156 of the feedback control section 153 receives a deviation Ve between the target distance G1t between the fixed reflective film 54 and the movable reflective film 55 and the detection value G1d of the distance between the fixed reflective film 54 and the movable reflective film 55, and performs the feedback control on the second electrostatic actuator 562. As the feedback control, a proportional-integral-differential (PID) control is performed. As a result, the relative position between the fixed reflective film 54 and the movable reflective film 55 changes. However, the amount of displacement of the movable reflective film 55 by the electrostatic attractive force of the second electrostatic actuator 562 is smaller than the amount of displacement of the movable reflective film 55 by the electrostatic attractive force of the first electrostatic actuator 561. The second electrostatic actuator 562 has an operation accuracy of several nm with respect to the position of the movable reflective film 55.

By performing the process of step S440 in FIG. 10, as compared with the aspect in which the process of step S450 is started immediately after the start of the process of step S436 where the detection value G1d of the distance between the fixed reflective film 54 and the movable reflective film 55 is greatly different from the new target distance G1t, the time required for the fixed reflective film 54 and the movable reflective film 55 to transition to the relative position, where the fixed reflective film 54 and the movable reflective film 55 face each other with the new target distance G1t apart, and stabilize, can be shortened.

Further, as compared to the aspect in which the process of step S450 is always started after the elapse of the inhibition time Ts after the start of the process of step S436, properly determining the threshold distance in step S430 of FIG. 10 has the following advantages. That is, when the difference between the new target distance G1t and the previous target distance is smaller than the threshold distance, the time until the distance of the inter-reflective film gap G1 converges to the new target distance G1t is also short after the target distance is changed. Therefore, by performing the process of step S430, when the difference between the new target distance G1t and the previous target distance is smaller than the threshold distance, the time required for the fixed reflective film 54 and the movable reflective film 55 to transition to the relative position, where the fixed reflective film 54 and the movable reflective film 55 face each other with a new target distance G1t apart, and stabilize, can be shortened.

Figure 11:
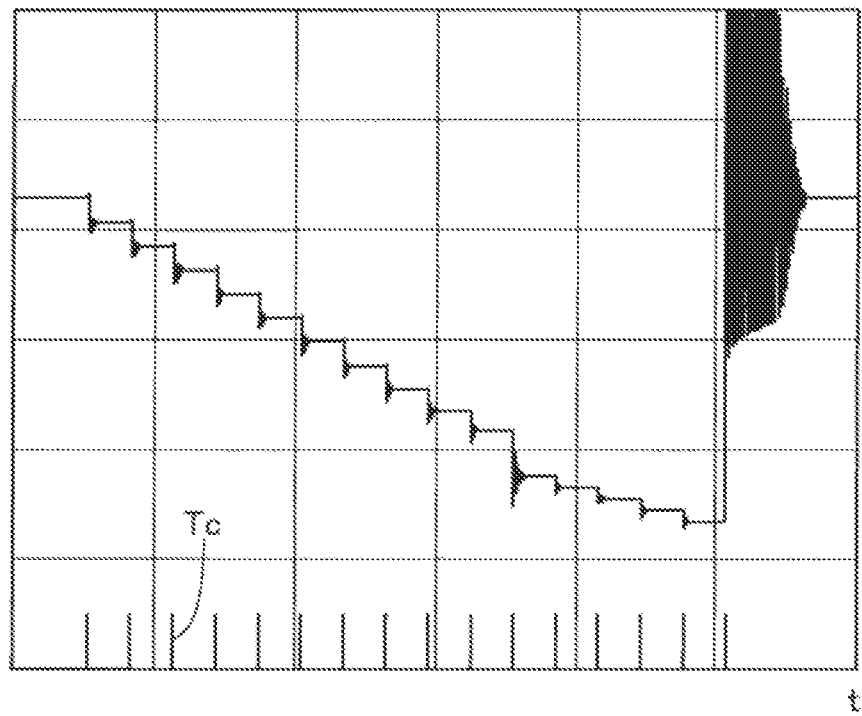
FIG. 11 is a graph representing a detection value of a distance of an inter-reflective film gap in a comparative aspect in which a process of step S450 is started immediately after the start of a process of step S436.

FIG. 11 is a graph representing the detection value G1d of the distance of the inter-reflective film gap G1 in the comparative aspect in which the process of step S450 is started immediately after the start of the process of step S436 without performing the process of steps S434 and S440 in FIG. 10. The horizontal axis in FIG. 11 is time t. At a plurality of timing Tc illustrated on the horizontal axis in FIG. 11, the target distance G1t of the inter-reflective film gap G1 is changed. The target distance G1t of the inter-reflective film gap G1 is gradually decreased in a step-like manner, and then greatly increased in a step-like manner. It can be seen that after the target distance G1t of the inter-reflective film gap G1 is greatly increased in a step-like manner, the distance G1d of the inter-reflective film gap G1 vibrates greatly, and it takes time to stabilize in the vicinity of the target distance G1t. This is due to the following reasons.

Immediately after the target distance G1t of the inter-reflective film gap G1 is changed, the distance between the fixed reflective film 54 and the movable reflective film 55 is a value close to the target distance before the change. Therefore, the feedback drive section 156 receives the deviation Ve between the target detection signal Vr according to the new target distance G1t between the fixed reflective film 54 and the movable reflective film 55, and the detection signal Vx according to the actual distance G1d close to the previous target distance between the fixed reflective film 54 and the movable reflective film 55 (see the lower left portion in FIG. 9).

As a result, the second electrostatic actuator 562 drastically displaces the movable portion 521 so as to eliminate the sudden increase in deviation Ve due to the change in target distance G1t. On the other hand, the first electrostatic actuator 561 also displaces the movable portion 521 to the direction toward the position corresponding to the new target distance G1t according to the supplied bias voltage Vb (see the upper right portion in FIG. 9). Therefore, the movable portion 521 is excessively displaced from the previous position to the direction toward the position corresponding to the new target distance G1t, and greatly overshoots. A lot of time is spent until this overshoot is eliminated and the fluctuation of the position of the movable portion is sufficiently small.

Figure 12:
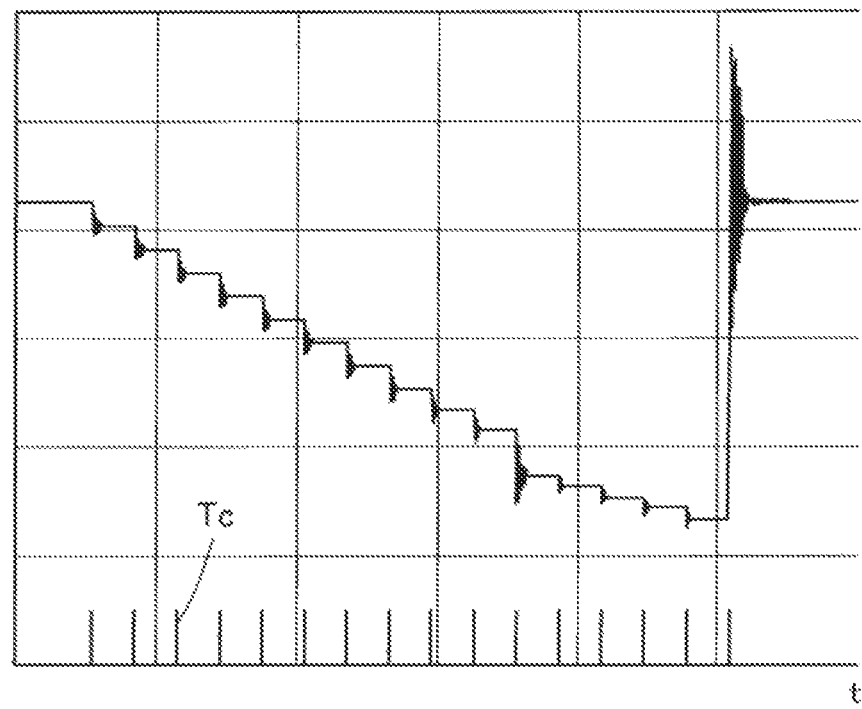
FIG. 12 is a graph representing the detection value of the distance of the inter-reflective film gap in the present embodiment.

FIG. 12 is a graph representing the detection value G1d of the distance of the inter-reflective film gap G1 in the present embodiment. The horizontal axis in FIG. 12 is time. The range indicated by the horizontal axis in FIG. 12 and the range indicated by the horizontal axis in FIG. 11 are the same. Also in the present embodiment illustrated in FIG. 12, the target distance G1t of the inter-reflective film gap G1 is changed in the same manner as in the comparative aspect in FIG. 11. Also in the present embodiment, after the target distance G1t of the inter-reflective film gap G1 is greatly increased in a step-like manner, the distance G1d of the inter-reflective film gap G1 vibrates. However, it can be seen that the amplitude of the vibration is smaller than that of the comparative aspect in FIG. 11, and the time required for stabilization in the vicinity of the target distance G1t is also short.

The variable wavelength interference filter 5 in the present embodiment is also referred to as a "variable wavelength filter". Further, the spectroscopic measurement device 1 that includes the optical module 10 including the variable wavelength interference filter 5 and the control section 20 is also referred to as a "variable wavelength filter" in a broad sense. The fixed reflective film 54 and the movable reflective film 55 are also collectively referred to as a "reflective film". The electrostatic actuator portion 56 is also referred to as an "actuator portion". The first electrostatic actuator 561 is also referred to as a "first actuator". The second electrostatic actuator 562 is also referred to as a "second actuator".

The function of the voltage control section 15 to perform the process of step S410 is also referred to as a "first function". The function of the voltage control section 15 to perform the process of step S436 is also referred to as a "second function". The function of the voltage control section 15 to perform the process of step S450 is also referred to as a "third function".

B. Second Embodiment

The spectroscopic measurement device of a second embodiment is different from the spectroscopic measurement device of the first embodiment in the contents of the first transition process of step S434 and the second transition process of step S440 in FIG. 10. Other points of the spectroscopic measurement device of the second embodiment are the same as those of the spectroscopic measurement device of the first embodiment.

Figure 13:
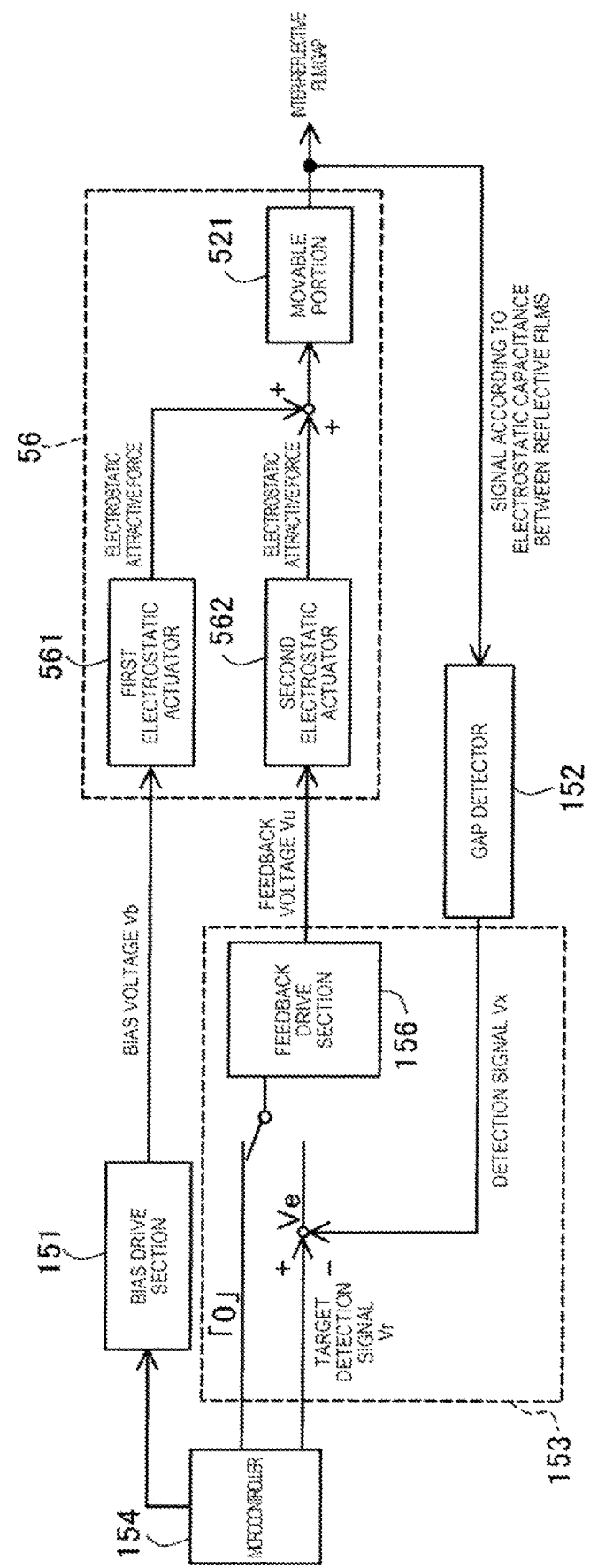
FIG. 13 is a block diagram illustrating the content of control executed in step S440 in FIG. 10 in a second embodiment.

FIG. 13 is a block diagram illustrating the content of control executed in step S440 in FIG. 10 in the second embodiment. In the second embodiment, in the first transition process of step S434 in FIG. 10, the feedback control section 153 performs the following control. That is, the feedback control section 153 inputs 0 as the deviation Ve to the feedback drive section 156 (see the middle left portion in FIG. 13).

In the second transition process of step S440, the feedback control section 153 performs the following control. That is, after the start of the process of step S436, in the second transition process of step S440 performed before the start of the process of step S450, during the inhibition time Ts, the feedback drive section 156 of the feedback control section 153 receives 0 as the deviation Ve (see the middle left portion in FIG. 13). After the start of the process of step S436, and after the elapse of a predetermined inhibition time Ts, the process of step S450 is started.

By performing such a process, the feedback drive section 156 of the feedback control section 153 does not perform the control to eliminate the deviation Ve. Therefore, after the start of the process in step S436, and before the start of the normal feedback control in step S450, the situation where the feedback control of the second electrostatic actuator 562 is performed, and the movable portion 521 is excessively displaced to eliminate the sudden increase in deviation due to the change in target distance, does not occur. As a result, the control of the relative position between the fixed reflective film 54 and the movable reflective film 55 can be stabilized.

C. Third Embodiment

The spectroscopic measurement device of a third embodiment is different from the spectroscopic measurement device of the first embodiment in the contents of the first transition process of step S434 and the second transition process of step S440 in FIG. 10. Other points of the spectroscopic measurement device of the third embodiment are the same as those of the spectroscopic measurement device of the first embodiment.

Figure 14:
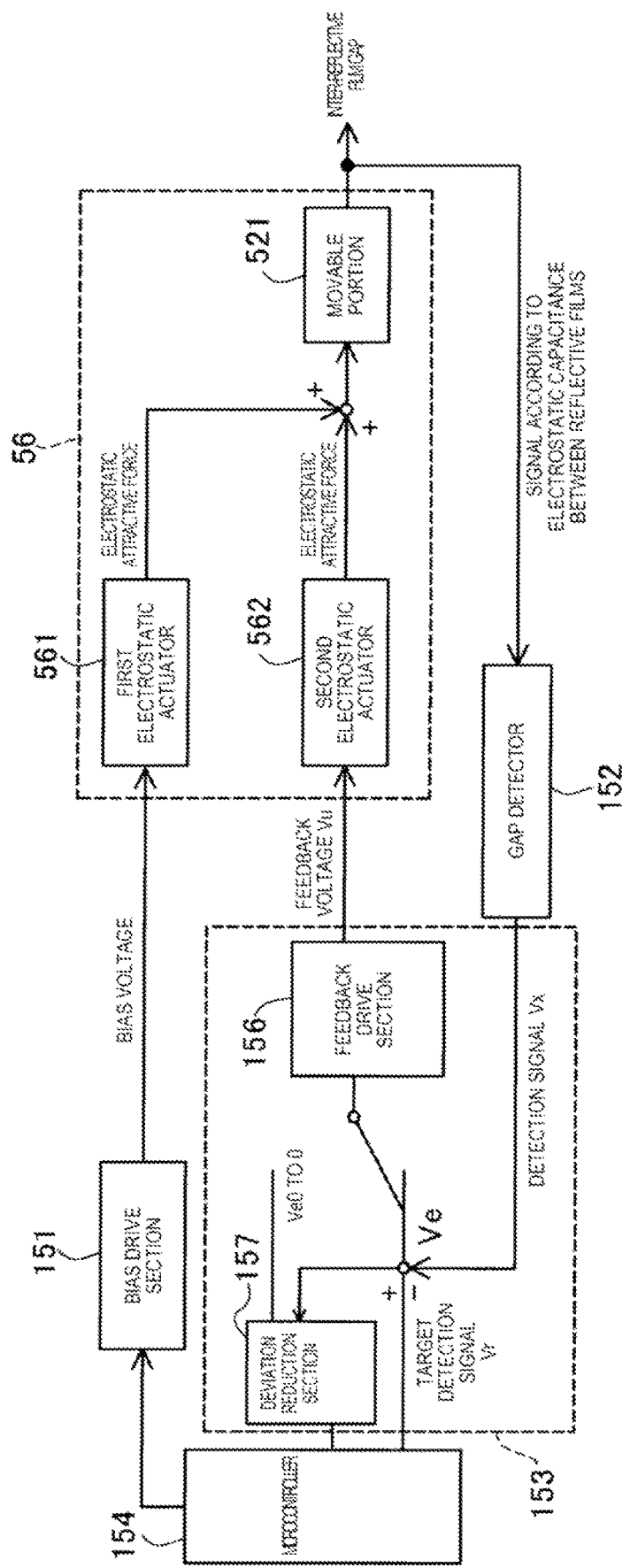
FIG. 14 is a block diagram illustrating the content of control executed in step S440 in FIG. 10 in a third embodiment.

FIG. 14 is a block diagram illustrating the content of control executed in step S440 in FIG. 10 in the third embodiment. In the third embodiment, in the first transition process of step S434 in FIG. 10, the feedback control section 153 performs the following control. That is, the deviation reduction section 157, which is a functional section of the feedback control section 153, acquires the value Ve0 of the deviation Ve at that time (see the middle left portion in FIG. 14).

In the second transition process of step S440, the feedback control section 153 performs the following control. That is, after the start of the process of step S436, in the second transition process of step S440 performed before the start of the process of step S450, during the inhibition time Ts, the feedback drive section 156 of the feedback control section 153 receives a value that monotonously decreases from the value Ve0 of the deviation Ve in step S434 to 0 as the deviation Ve instead of the actual deviation Ve. The deviation Ve that monotonously decreases from the value of the deviation Ve0 in step S434 to 0 is input from the deviation reduction section 157 (see the middle left portion in FIG. 14). After the start of the process in step S436, and after the elapse of the inhibition time Ts, the deviation input to the feedback drive section 156 is returned to the actual deviation Ve, and the process proceeds to step S450.

Figure 15:
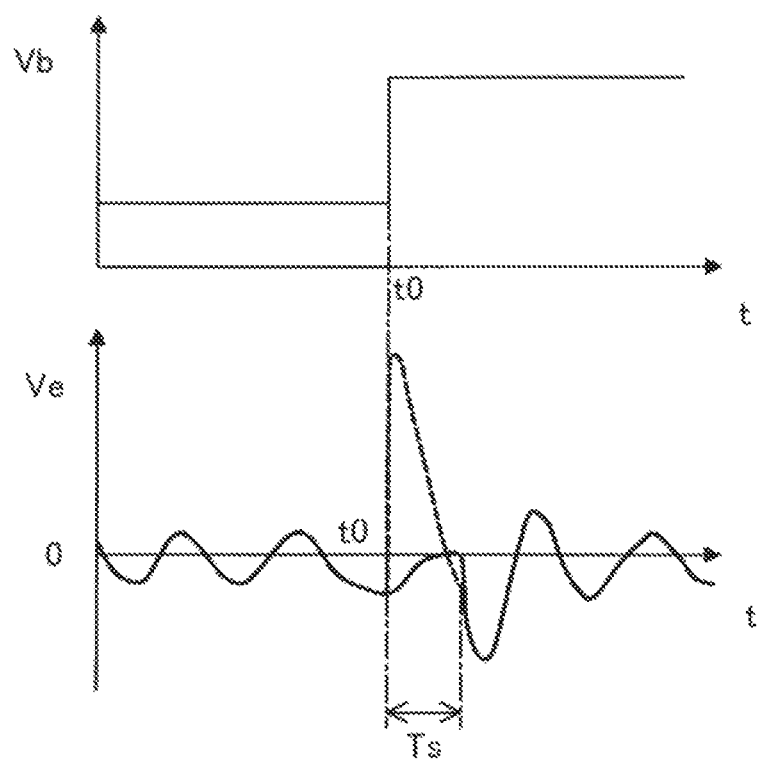
FIG. 15 is a graph illustrating changes in bias voltage and deviation accompanying a change in target distance.

FIG. 15 is a graph illustrating changes in bias voltage Vb and deviation Ve accompanying a change in target distance G1t. The upper portion in FIG. 15 is a graph illustrating the change in bias voltage Vb accompanying a change in target distance G1t. The lower portion in FIG. 15 is a graph illustrating the change in deviation Ve accompanying the change in target distance G1t. In the upper and lower graphs in FIG. 15, the horizontal axis is time. The range indicated by the horizontal axis in the upper portion in FIG. 15 and the range indicated by the horizontal axis in the lower portion in FIG. 15 are the same.

At time t0, the bias voltage Vb is changed (see the upper portion in FIG. 15). The deviation between the target distance G1t and the detection value G1d between the fixed reflective film 54 and the movable reflective film 55 in the comparative aspect in which the processes of steps S430 and S440 in FIG. 10 are not performed, is illustrated by a broken line in the lower portion in FIG. 15. On the other hand, the deviation that monotonously decreases toward 0 in the present embodiment is illustrated by a solid line during the inhibition time Ts in the lower portion in FIG. 15.

By performing the above-mentioned process in step S440, it is possible to avoid a situation in which the deviation Ve suddenly changes greatly. As a result, as compared with the comparative aspect in which the process of step S440 in FIG. 10 is not performed, the control of the relative position between the fixed reflective film 54 and the movable reflective film 55 can be stabilized. Further, since the deviation Ve changes more gentle as compared with that of in the second embodiment, it is possible to further stabilize the control of the relative position between the fixed reflective film 54 and the movable reflective film 55 than in the second embodiment.

D. Fourth Embodiment

The spectroscopic measurement device of a fourth embodiment is different from the spectroscopic measurement device of the first embodiment in the contents of the first transition process of step S434 and the second transition process of step S440 in FIG. 10. Other points of the spectroscopic measurement device of the fourth embodiment are the same as those of the spectroscopic measurement device of the first embodiment.

(1) First Aspect:

In a first aspect of the fourth embodiment, in the first transition process of step S434 in FIG. 10, the feedback control section 153 performs the following control. That is, the feedback control section 153 sets the feedback control executed by the feedback drive section 156 to the proportional-differential (PD) control (see the middle left portion in FIG. 9).

After the start of the process of step S436, in the second transition process of step S440 performed before the start of the process of step S450, during the inhibition time Ts, the feedback drive section 156 performs the PD control as the feedback control. That is, in the feedback control performed in the transition process of step S440, the gain of the integration element is 0. After the start of the process in step S436, and after the elapse of the inhibition time Ts, the feedback control executed by the feedback drive section 156 is returned to the PID control, and the process proceeds to step S450.

Immediately after the target distance G1t of the inter-reflective film gap G1 is changed, the distance between the fixed reflective film 54 and the movable reflective film 55 is a value close to the target distance before the change. Therefore, immediately after the target distance G1t of the inter-reflective film gap G1 is changed, the deviation Ve is large. When the PID control including the integration element is performed immediately after the target distance G1t of the inter-reflective film gap G1 is changed, a large deviation Ve for a while immediately after the target distance G1t of the inter-reflective film gap G1 is changed gives a large affection to the subsequent control.

However, according to the first aspect of the present embodiment, because of the integration element, it is possible to prevent a situation in which a state, where the deviation Ve immediately after the start of the process in step S436 is large, gives a large affection to the control of the relative position between the fixed reflective film 54 and the movable reflective film 55. The relative position between the fixed reflective film 54 and the movable reflective film 55 can be set to a relative position corresponding to the new target distance G1t at an early stage.

(2) Second Aspect:

In a second aspect of the fourth embodiment, in the first transition process of step S434 in FIG. 10, the feedback control section 153 performs the following control. That is, the feedback control section 153 sets the integration gain in the PID control executed by the feedback drive section 156 to 0 (see the middle left portion in FIG. 9).

After the start of the process of step S436, in the second transition process of step S440 performed before the start of the process of step S450, during the inhibition time Ts, the feedback drive section 156 performs the proportional-integral-differential (PID) control as the feedback control. However, the feedback drive section 156 performs the PID control in which the gain of the integration element monotonously increases from 0 to the value of the gain of the integration element in the PID control in step S450. It is assumed that the gain of the integration element increases linearly with the elapsed time. After the start of the process of step S436, at the time of the elapse of the inhibition time Ts, the value of the gain of the integration element of the feedback control executed by the feedback drive section 156 matches the value of the gain of the integration element in the PID control in step S450. After that, the process proceeds to step S450.

According to the second aspect of the present embodiment, similar to the first aspect, because of the integration element, it is possible to prevent a situation in which a state, where the deviation Ve immediately after the start of the process in step S436 is large, gives a large affection to the control of the relative position between the fixed reflective film 54 and the movable reflective film 55. Further, when transitioning from the feedback control in step S440 to the feedback control in step S450, it is possible to prevent the situation in which the control becomes unstable.

E. Other Embodiments

E1. Other Embodiment 1

(1) In the above embodiment, the variable wavelength interference filter 5 in which the fixed substrate 51 and the movable substrate 52 are bonded by the bonding film 53 has been described (see the lower left portion in FIG. 2). However, the variable wavelength interference filter can also be in other aspects. The variable wavelength interference filter can also be configured as follows, for example.

Figure 16:
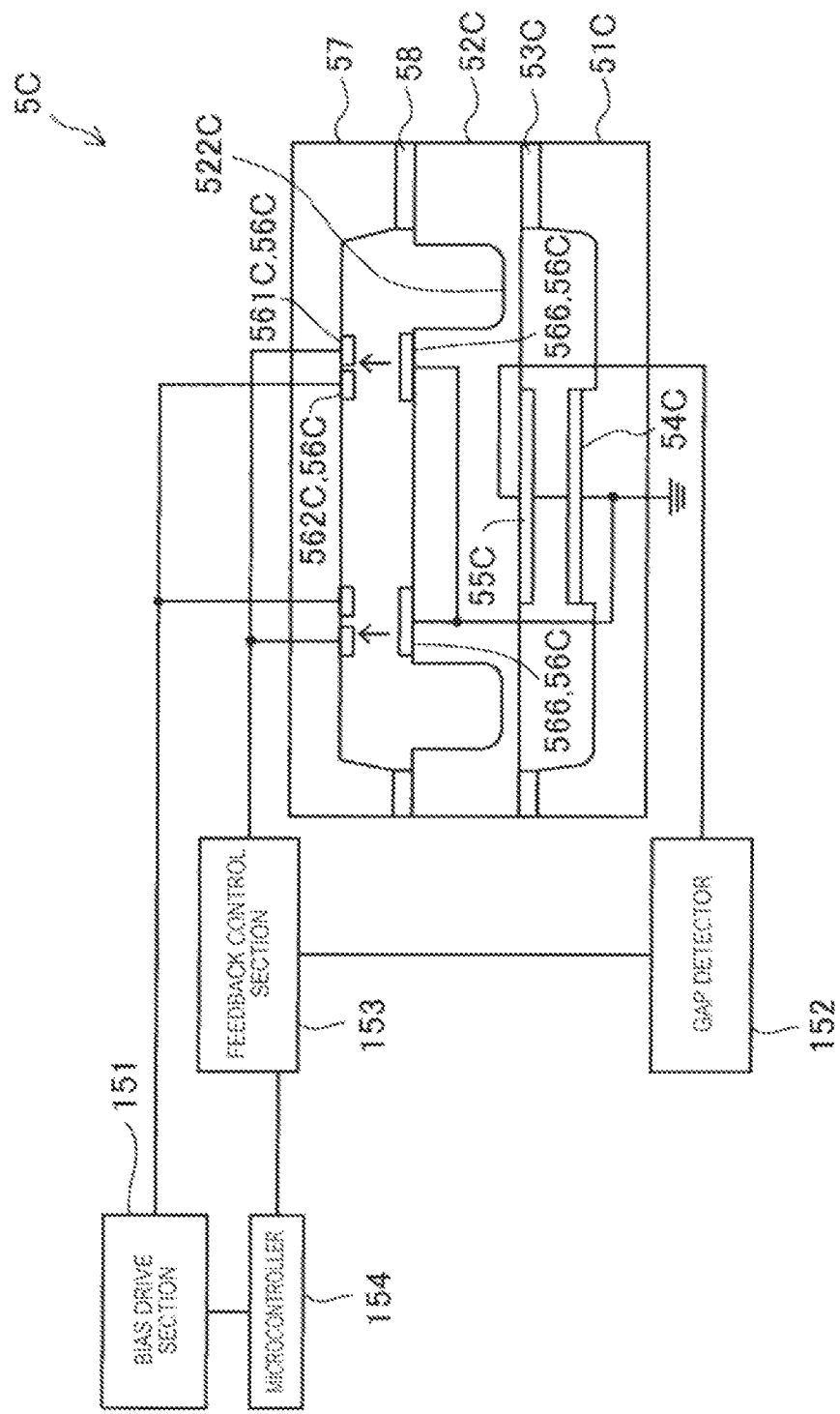
FIG. 16 is a block diagram illustrating a schematic configuration of another optical module.

FIG. 16 is a block diagram illustrating a schematic configuration of another optical module. The variable wavelength interference filter 5C includes a first fixed substrate 51C, a movable substrate 52C, a first bonding film 53C, a fixed reflective film 54C, a movable reflective film 55C, an electrostatic actuator portion 56C, a second fixed substrate 57, and a second bonding film 58. In FIG. 16, elements having the same configuration or function as those in the first embodiment are illustrated with the same reference numerals as the corresponding elements in FIG. 2. In FIG. 16, the elements corresponding to the elements of the first embodiment are indicated by reference numerals having a C at the end of the elements of the first embodiment.

The first fixed substrate 51C supports the fixed reflective film 54. The movable substrate 52C supports the movable reflective film 55 inside the region surrounded by the holding portion 522. The first bonding film 53C bonds the first fixed substrate 51C and the movable substrate 52C.

The movable substrate 52C is provided with an electrode 566 constituting the electrostatic actuator portion 56C on a surface facing the second fixed substrate 57. The second fixed substrate 57 is provided with electrodes 561C and 562C constituting the electrostatic actuator portion 56C on a surface facing the movable substrate 52C. The second bonding film 58 bonds the second fixed substrate 57 and the movable substrate 52.

The electrode 561C and the electrode 566 constitute the first electrostatic actuator 561. The function of the first electrostatic actuator 561 of the present embodiment is the same as that of the first electrostatic actuator 561 of the first embodiment. The electrode 562C and the electrode 566 constitute the second electrostatic actuator 562. The function of the second electrostatic actuator 562 of the present embodiment is the same as that of the second electrostatic actuator 562.

(2) In each of the above embodiments, the spectroscopic measurement device 1 is exemplified as the electronic device according to the present disclosure. However, various fields can be applied to the driving method, the optical module, and the electronic device of the variable wavelength interference filter according to the present disclosure. For example, the electronic device according to the present disclosure can also be applied to a color measurement device for measuring color.

Figure 17:
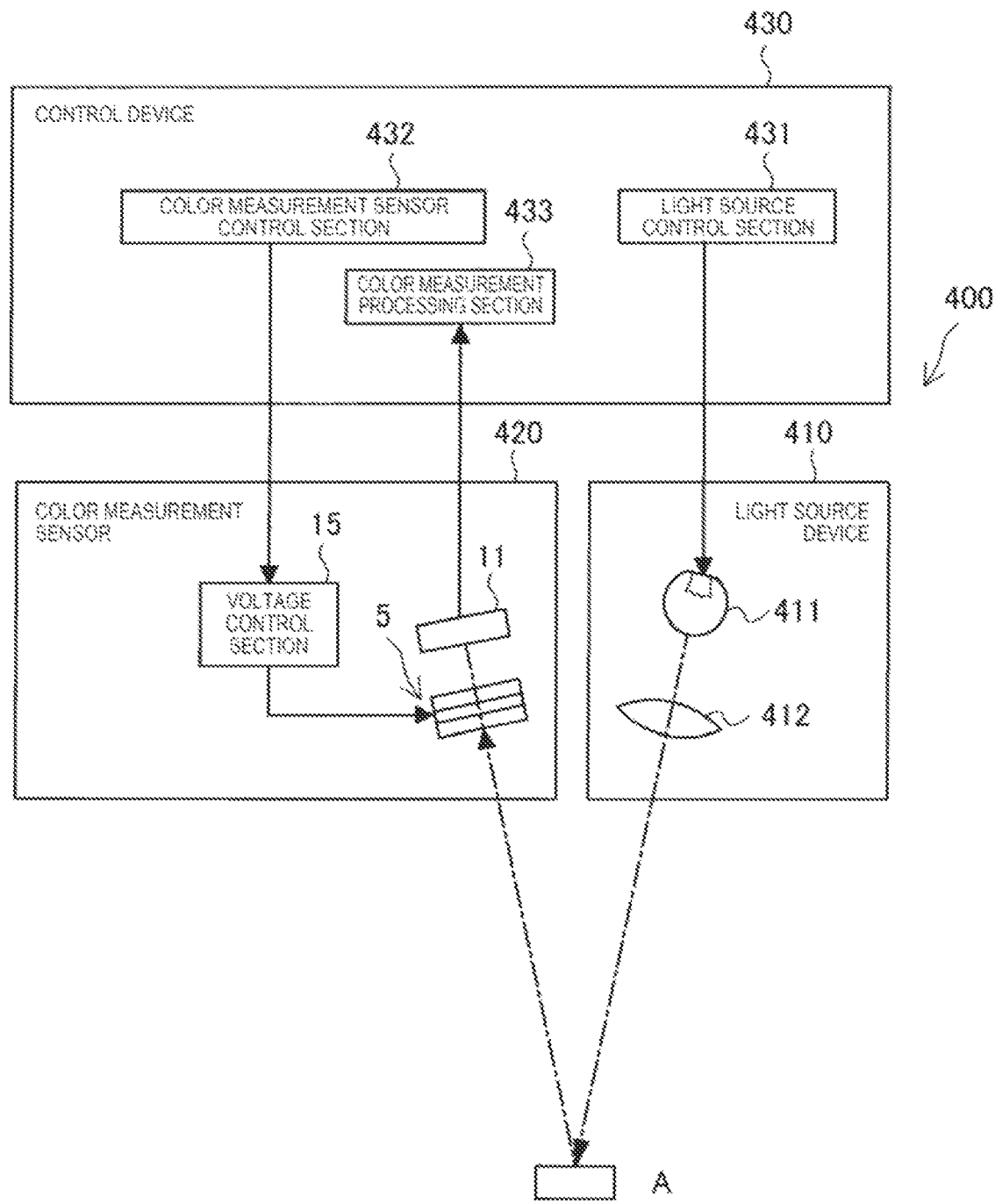
FIG. 17 is a block diagram illustrating an example of a color measurement device provided with a variable wavelength interference filter.

FIG. 17 is a block diagram illustrating an example of a color measurement device 400 provided with the variable wavelength interference filter. The color measurement device 400 includes a light source device 410 that emits light to an inspection target A, a color measurement sensor 420 as an optical module, and a control device 430 that controls the overall operation of the color measurement device 400. The color measurement device 400 reflects the light emitted from the light source device 410 by the inspection target A, receives the inspection target light from the inspection target A by the color measurement sensor 420, and analyzes and measures the chromaticity of the inspection target light, that is, the color of the inspection target Abased on the detection signal output from the color measurement sensor 420.

The light source device 410 includes a light source 411 and a plurality of lenses 412, and emits reference light, for example, white light, to the inspection target A. Note that, in FIG. 17, only one lens 412 is illustrated in order to facilitate the understanding of the technique. The plurality of lenses 412 may include a collimator lens. In this case, using the reference light emitted from the light source 411 as parallel light by a collimator lens, the light source device 410 emits the light from a projection lens (not shown) toward the inspection target A. Note that, in the present embodiment, the color measurement device 400 including the light source device 410 is exemplified, but for example, when the inspection target A is a light emitting member such as a liquid crystal panel, the light source device 410 may not be provided.

The color measurement sensor 420 includes a variable wavelength interference filter 5, a detection section 11 that receives light transmitted through the variable wavelength interference filter 5, and a voltage control section 15 that changes the wavelength of the light transmitted by the variable wavelength interference filter 5. Further, the color measurement sensor 420 includes an incident optical lens that guides the inspection target light reflected by the inspection target A to the inside at a position facing the variable wavelength interference filter 5. Note that, FIG. 17 does not illustrate an incident optical lens in order to facilitate understanding of the technique. The color measurement sensor 420 disperses light having a predetermined wavelength of the inspection target light entered from the incident optical lens by the variable wavelength interference filter 5, and the dispersed light is received by the detection section 11.

The control device 430 controls the entire operation of the color measurement device 400. As the control device 430, for example, a general-purpose personal computer, a portable information terminal, or a computer dedicated to color measurement can be used. Further, the control device 430 is configured to include a light source control section 431, a color measurement sensor control section 432, a color measurement processing section 433, and the like.

The light source control section 431 is coupled to the light source device 410 and emits white light having a predetermined brightness by outputting a predetermined control signal to the light source device 410 based on the user's setting input, for example. The color measurement sensor control section 432 is coupled to the color measurement sensor 420. The color measurement sensor control section 432 sets the wavelength of the light received by the color measurement sensor 420 based on, for example, the user's setting input and outputs a control signal that detects the received amount of light of this wavelength to the color measurement sensor 420. As a result, the voltage control section 15 of the color measurement sensor 420 applies a voltage to the electrostatic actuator portion 56 based on the control signal and drives the variable wavelength interference filter 5. The color measurement processing section 433 analyzes the chromaticity of the inspection target A from the received amount of light detected by the detection section 11.

As described above, the variable wavelength interference filter, the optical module, and the electronic device according to the present disclosure can be applied to any device that disperses a predetermined light from the incident light. Since the variable wavelength interference filter according to the present disclosure can disperse a plurality of wavelengths with one device as described above, it is possible to accurately measure the spectra of a plurality of wavelengths and detect a plurality of components. Therefore, as compared with the device in the related art that extracts a desired wavelength by a plurality of devices, the miniaturization of the optical module or the electronic device can be promoted, and for example, the optical module can be suitably used as a portable or in-vehicle optical device.

(3) Specifically, in the above embodiment, the fixed reflective film 54 and the movable reflective film 55 are a metal film such as Ag or a conductive alloy film such as Ag alloy. However, the fixed reflective film 54 and the movable reflective film 55 may be a dielectric multilayer film in which the high refractive layer is $TiO_2$ and the low refractive layer is $SiO_2$. In this case, it is preferable that a conductive metal alloy film is formed on the bottom layer or the surface layer of the dielectric multilayer film. Further, the fixed reflective film 54 and the movable reflective film 55 may have different configurations from each other or may have the same configuration.

(4) In the above embodiment, the electrostatic actuator portion 56 includes the first electrostatic actuator 561 and the second electrostatic actuator 562. However, the actuator portion may also be an actuator driven by a principle other than electrostatic force.

(5) In the above embodiment, an example in which a bias voltage Vb is applied so that the sensitivity Rc becomes constant is illustrated. However, the value of the bias voltage Vb is not limited to the value based on the equation (2), and the bias voltage Vb may be applied so as to obtain a desired sensitivity characteristics.

(6) In the above embodiment, in step S430 in FIG. 10, the determination is performed by using the bias voltage Vb. However, the determination process of step S430 may be performed based on the target value of the detection signal Vx of the distance.

(7) The process of step S430 in FIG. 10 may be performed before the filter control section 24 outputs the control signal of the target wavelength to the voltage control section 15.

(8) In the above embodiment, step S440 in FIG. 10 is performed within the inhibition time Ts. However, the transition process may be performed until a predetermined condition related to an operation state of the variable wavelength interference filter 5 is satisfied.

(9) In the above embodiment, an example of measuring the measurement target light reflected by the measurement target X and the inspection target A is illustrated. However, when a light emitting body such as a liquid crystal panel is used as the measurement target, for example, the light emitted from the light emitting body may be used as the measurement target light.

E2. Other Embodiment 2

In the above first embodiment, after the start of the process of step S436, and before the start of the process of step S450, the second electrostatic actuator 562 is supplied a drive voltage Vu having the same magnitude as the drive voltage Vu supplied by the feedback control section 153 before the start of the process of step S436 from the feedback control section 153. However, another voltage, for example, a voltage obtained by multiplying the drive voltage Vu supplied by the feedback control section 153 before the start of the process of step S436 by a certain coefficient, may be supplied to the second electrostatic actuator 562.

E3. Other Embodiment 3

In the above second embodiment, after the start of the process of step S436, in the transition process of step S440 performed before the start of the process of step S450, during the inhibition time Ts, the feedback control section 153 receives 0 as the deviation Ve. However, in the transition process of step S440, a constant value other than 0 maybe input.

E4. Other Embodiment 4

In the above second embodiment, after the start of the process of step S436, in the transition process of step S440 performed before the start of the process of step S450, during the inhibition time Ts, the feedback control section 153 receives a value that monotonously decreases from the value Ve0 of the deviation Ve immediately before the start of the process of step S436 to 0 as the deviation Ve. Note that, in the present specification, the "monotonously decrease" also includes the change which has a constant value in a predetermined time section.

However, Ve0 can be another value. However, it is preferable that Ve0 is a value of deviation Ve after step S410 and before the start of the process of step S436. Further, the feedback control section 153 may receive a value that increases in apart of the time section as a deviation Ve instead of a monotonously decrease.

E5. Other Embodiment 5

In the first aspect of the fourth embodiment, after the start of the process of step S436, in the transition process of step S440 performed before the start of the process of step S450, during the inhibition time Ts, the feedback control section 153 performs the proportional-differential (PD) control as the feedback control. However, for example, as illustrated in the second aspect of the fourth embodiment, another control maybe performed. Further, the process of step S440 may be executed at least in a part of the time section after the start of the process of step S436 and before the start of the process of step S450.

E6. Other Embodiment 6

In the second aspect of the fourth embodiment, after the start of the process of step S436, in the transition process of step S440 performed before the start of the process of step S450, the feedback control section 153 performs the PID control in which the gain of the integration element monotonously increases from 0 to the value of the gain of the integration element in the PID control in step S450. Note that, in the present specification, the "monotonously increase" also includes the change which has a constant value in a predetermined time section. However, not only for the gain of the integration element but also for one or more of the gain of the integration element, the gain of the position element, and the gain of the differential element, it is possible to perform the changed feedback control.

E7. Other Embodiment 7

In the first embodiment, in step S430 in FIG. 10, the filter control section 24 determines whether or not a difference between the new target distance G1t between the fixed reflective film 54 and the movable reflective film 55 and the previous target distance between the fixed reflective film 54 and the movable reflective film 55, is larger than a predetermined threshold distance. However, the determination condition may be another condition related to the operation state of the variable wavelength interference filter 5. Further, it is also possible to use an aspect that always executes the process of step S440 without performing such a determination.

E8. Other Embodiment 8

In the first embodiment, the inhibition time Ts is ¼ time of the cycle of the natural vibration of a configuration that includes the movable portion 521 displaced by the first electrostatic actuator 561 in the variable wavelength interference filter 5. However, the inhibition time Ts for performing the process of step S440 can be set to another value such as ½ time of the cycle of the natural vibration, the same time as the cycle of the natural vibration, [¼+N (N is a positive integer)] times the cycle of the natural vibration, or the like. However, the inhibition time may be the 95% to 105% of time of ¼ of the cycle of the natural vibration of a configuration which is displaced by the first actuator and includes at least one of the two reflective films in the variable wavelength filter, or time obtained by adding the time N (N is a positive integer) times the cycle of the natural vibration to the 95% to 105% time of ¼ of the cycle of the natural vibration.

F. Further Other Embodiment

The present disclosure is not limited to the above-described embodiments and can be realized with various forms without departing from the spirit of the present disclosure. For example, the present disclosure can also be realized in the following forms. The technical features in the above embodiments corresponding to the technical features in each form described below can be appropriately replaced or combined in order to solve some or all of the problems of the present disclosure or to achieve some or all of the effects of the present disclosure. Further, when technical features are not described as essential in the present specification, the technical features can be deleted as appropriate.

(1) According to one embodiment of the present disclosure, there is provided a control method of a variable wavelength filter including two reflective films facing each other and an actuator group configured to change a relative position between the two reflective films. The actuator group includes a first actuator that is driven according to a target distance between the two reflective films and a second actuator in which a feedback control is performed according to the target distance and a detection value of a distance between the two reflective films. The control method includes (a) receiving a new target distance between the two reflective films, (b) changing the relative position between the two reflective films by driving the first actuator according to the new target distance, and (c) changing the relative position between the two reflective films by performing the feedback control on the second actuator according to the new target distance and the detection value of the distance between the two reflective films. When a predetermined condition is satisfied, after start of the (b), and after elapse of a predetermined inhibition time, the (c) is started.

With such an aspect, as compared with the aspect in which the (c) is started immediately after the start of the (b) in which the detection value of the distance between the two reflective films is greatly different from the new target distance, the time required for the two reflective films to transition to the relative position, where two reflective films face each other with a new target distance apart, and stabilize, can be shortened.

(2) In the control method of the above embodiment, in one aspect, the variable wavelength filter may include a feedback processor that performs the feedback control on the second actuator, and after start of the (b), and before start of the (c), the feedback processor may not perform a calculation of the feedback control, and the second actuator may be supplied with a drive voltage having the same magnitude as a drive voltage applied by the feedback processor before start of the (b).

With such an aspect, after start of the (b), and before start of the (c), it is possible to stabilize the control of the relative position between the two reflective films.

(3) In the control method of the above embodiment, in one aspect, the variable wavelength filter may include a feedback processor that performs the feedback control on the second actuator, the feedback processor may include a feedback drive processor, which receives a deviation between the target distance between the two reflective films and the detection value of the distance between the two reflective films and performs the feedback control on the second actuator, and after start of the (b), and before start of the (c), the feedback drive processor may receive 0 as the deviation and perform the feedback control.

With such an aspect, after start of the (b), and before start of the (c), it is possible to stabilize the control of the relative position between the two reflective films.

(4) In the control method of the above embodiment, in one aspect, the variable wavelength filter may include a feedback processor that performs the feedback control on the second actuator, the feedback processor may include a feedback drive processor, which receives a deviation between the target distance between the two reflective films and the detection value of the distance between the two reflective films and performs the feedback control on the second actuator, and after start of the (b), and before start of the (c), the feedback drive processor may receive a value, which monotonously decreases from a value of a deviation before start of the (b) to the 0, as the deviation and perform the feedback control.

With such an aspect, it is possible to avoid a situation in which the deviation suddenly changes greatly after start of the (b) and before start of the (c). It is possible to stabilize the control of the relative position between the two reflective films immediately after start of the (b).

(5) In the control method of the above embodiment, in one aspect, the control method may further include (d) after start of the (b) and before elapse of the inhibition time, changing the relative position between the two reflective films by performing the feedback control on the second actuator according to the new target distance and the detection value of the distance between the two reflective films, in which the (c) may perform a PID control as the feedback control, and the (d) may perform a PD control as the feedback control.

With such an aspect, because of the integration element, it is possible to prevent a situation in which a state, where the deviation between the target distance between the two reflective films immediately after the start of the (b) and the detection value of the distance between two reflective films is large, gives a large affection to the control of the relative position between the two reflective films.

(6) In the control method of the above embodiment, in one aspect, the control method may further include (d) after start of the (b) and before elapse of the inhibition time, changing the relative position between the two reflective films by performing the feedback control on the second actuator according to the new target distance and the detection value of the distance between the two reflective films, in which the (c) may perform a PID control as the feedback control, and the (d) may perform the PID control as the feedback control, and a control that a gain of an integration element monotonously increases from 0 to a value of a gain of an integration element in the (c).

With such an aspect, because of the integration element, it is possible to prevent a situation in which a state, where the deviation between the target distance between the two reflective films immediately after the start of the (b) and the detection value of the distance between two reflective films is large, gives a large affection to the control of the relative position between the two reflective films. Further, it is possible to prevent a situation in which the control becomes unstable at start of the (c).

(7) In the control method of the above embodiment, in one aspect, in the predetermined condition, a difference between the new target distance and a previous target distance between the two reflective films may be larger than a predetermined threshold distance.

With such an aspect, by appropriately determining the threshold distance, the following advantages are obtained as compared with the aspect in which the (c) is always started after the elapse of the inhibition time after start of the (b). That is, when the difference between the new target distance and the previous target distance is smaller than the threshold, the time required for the two reflective films to transition to the relative position where the two reflective films face each other with the new target distance apart and stabilize, can be is shortened.

(8) In the control method of the above embodiment, in one aspect, the inhibition time may be 90% to 110% of time of ¼ of a cycle of natural vibration of a configuration a configuration which is displaced by the first actuator and includes at least one of the two reflective films in the variable wavelength filter.

After the start of the (b), at the timing when ¼ time of the cycle of the natural vibration of the above configuration elapses, it can be estimated that the relative distance between the two reflective films changed by the first actuator is the closest to the target distance. Therefore, in the above aspect, as compared with the aspect in which the inhibition time is less than 90% or greater than 110% of time of ¼ of the cycle of the natural vibration of the above configuration, the time required for the two reflective films to transition to the relative position where the two reflective films face each other with the new target distance apart and stabilize, can be is shortened.

(9) According to another embodiment of the present disclosure, a variable wavelength filter is provided. The variable wavelength filter includes two reflective films facing each other, an actuator group configured to change the relative position between the two reflective films, and a control section that controls the actuator group. The actuator group includes a first actuator that is driven according to a target distance between the two reflective films and a second actuator in which a feedback control is performed according to the target distance and a detection value of a distance between the two reflective films. The control section receives a new target distance between the two reflective films, changes the relative position between the two reflective films by driving the first actuator according to the new target distance, and changes the relative position between the two reflective films by performing the feedback control on the second actuator according to the new target distance and the detection value of the distance between the two reflective films, in which when the predetermined condition is satisfied, after the start of the process of changing the relative position between the two reflective films by the first actuator, and after elapse of the predetermined inhibition time, the process of changing the relative position between the two reflective films by the second actuator is started.

(10) According to still another embodiment of the present disclosure, a non-transitory computer-readable storage medium storing a computer program that causes a computer to control a variable wavelength filter including two reflective films facing each other and an actuator group configured to change a relative position between the two reflective films is provided. The actuator group includes a first actuator that is driven according to a target distance between the two reflective films and a second actuator in which a feedback control is performed according to the target distance and a detection value of a distance between the two reflective films. The computer program causes the computer to realize (a) a first function of receiving a new target distance between the two reflective films, (b) a second function of changing the relative position between the two reflective films by driving the first actuator according to the new target distance, and (c) a third function of changing the relative position between the two reflective films by performing the feedback control on the second actuator according to the new target distance and the detection value of the distance between the two reflective films, in which when the predetermined condition is satisfied, the computer program causes the computer to start the process by the third function after the elapse of the predetermined inhibition time after the start of the process by the second function.

The present disclosure can also be realized in various forms other than the variable wavelength filter, the control method of the variable wavelength filter, and the computer program. For example, it can be realized in the form of a device including a variable wavelength filter, a method of manufacturing the variable wavelength filter, a method of using the variable wavelength filter, and the like.

What is claimed is:

1. A control method of a variable wavelength filter including two reflective films facing each other and an actuator group configured to change a relative position between the two reflective films, in which
    the actuator group includes
        a first actuator driven according to a target distance between the two reflective films, and
        a second actuator in which a feedback control is performed according to the target distance and a detection value of a distance between the two reflective films,
    the control method comprising:
        (a) receiving a new target distance between the two reflective films;
        (b) changing the relative position between the two reflective films by driving the first actuator according to the new target distance; and
        (c) changing the relative position between the two reflective films by performing the feedback control on the second actuator according to the new target distance and the detection value of the distance between the two reflective films, wherein
    when a predetermined condition is satisfied, after start of the (b), and after elapse of a predetermined inhibition time, the (c) is started.

2. The control method according to claim 1, wherein
    the variable wavelength filter includes a feedback processor that performs the feedback control on the second actuator, and
    after start of the (b), and before start of the (c), the feedback processor does not perform a calculation of the feedback control, and the second actuator is supplied with a drive voltage having the same magnitude as a drive voltage applied by the feedback processor before start of the (b).

3. The control method according to claim 1, wherein
    the variable wavelength filter includes a feedback processor that performs the feedback control on the second actuator, the feedback processor includes a feedback drive processor, which receives a deviation between the target distance between the two reflective films and the detection value of the distance between the two reflective films and performs the feedback control on the second actuator, and after start of the (b), and before start of the (c), the feedback drive processor receives 0 as the deviation and performs the feedback control.

4. The control method according to claim 1, wherein the variable wavelength filter includes a feedback processor that performs the feedback control on the second actuator, the feedback processor includes a feedback drive processor, which receives a deviation between the target distance between the two reflective films and the detection value of the distance between the two reflective films and performs the feedback control on the second actuator, and after start of the (b), and before start of the (c), the feedback drive processor receives a value, which monotonously decreases from a value of a deviation before start of the (b) to 0, as the deviation and performs the feedback control.

5. The control method according to claim 1, further comprising:

(d) after start of the (b) and before elapse of the inhibition time, changing the relative position between the two reflective films by performing the feedback control on the second actuator according to the new target distance and the detection value of the distance between the two reflective films, wherein the (c) performs a PID control as the feedback control, and the (d) performs a PD control as the feedback control.

6. The control method according to claim 1, further comprising:

(d) after start of the (b), and before elapse of the inhibition time, changing the relative position between the two reflective films by performing the feedback control on the second actuator according to the new target distance and the detection value of the distance between the two reflective films, wherein the (c) performs a PID control as the feedback control, and the (d) performs the PID control as the feedback control, and a control that a gain of an integration element monotonously increases from 0 to a value of a gain of an integration element in the (c).

7. The control method according to claim 1, wherein in the predetermined condition, a difference between the new target distance and a previous target distance between the two reflective films is larger than a predetermined threshold distance.

8. The control method according to claim 1, wherein the inhibition time is 90% to 110% of time of ¼ of a cycle of natural vibration of a configuration a configuration which is displaced by the first actuator and includes at least one of the two reflective films in the variable wavelength filter.

9. A variable wavelength filter comprising:
two reflective films facing each other;
an actuator group configured to change a relative position between the two reflective films; and
one or a plurality of processors controlling the actuator group, wherein
the actuator group includes
 a first actuator driven according to a target distance between the two reflective films, and
 a second actuator in which a feedback control is performed according to the target distance and a detection value of a distance between the two reflective films,
the one or the plurality of processors
 receive a new target distance between the two reflective films,
 change the relative position between the two reflective films by driving the first actuator according to the new target distance, and
 change the relative position between the two reflective films by performing the feedback control on the second actuator according to the new target distance and the detection value of the distance between the two reflective films, and
when a predetermined condition is satisfied, after start of a process of changing the relative position between the two reflective films by the first actuator, and after elapse of a predetermined inhibition time, a process of changing the relative position between the two reflective films by the second actuator is started.

10. A non-transitory computer-readable storage medium storing a computer program that causes one or a plurality of processors to control a variable wavelength filter including two reflective films facing each other and an actuator group configured to change a relative position between the two reflective films, in which
the actuator group includes
 a first actuator driven according to a target distance between the two reflective films, and
 a second actuator in which a feedback control is performed according to the target distance and a detection value of a distance between the two reflective films,
the computer program comprising instructions that cause the one or the plurality of processors to execute:
 (a) receiving a new target distance between the two reflective films;
 (b) changing the relative position between the two reflective films by driving the first actuator according to the new target distance; and
 (c) changing the relative position between the two reflective films by performing the feedback control on the second actuator according to the new target distance and the detection value of the distance between the two reflective films, and
when a predetermined condition is satisfied, after causing the one or the plurality of processors to start execution of changing the relative position in the (b), and after elapse of a predetermined inhibition time, the instructions further cause the one or the plurality of processors to start execution of changing the relative position in the (c).

* * * * *